(12) United States Patent
Matsuki et al.

(10) Patent No.: US 7,100,429 B2
(45) Date of Patent: Sep. 5, 2006

(54) SURFACE PROFILE MEASURING INSTRUMENT AND SURFACE PROFILE MEASURING METHOD

(75) Inventors: Kaoru Matsuki, Tsukuba (JP); Kazuhiko Hidaka, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 394 days.

(21) Appl. No.: 10/614,203

(22) Filed: Jul. 8, 2003

(65) Prior Publication Data
US 2005/0076522 A1    Apr. 14, 2005

(30) Foreign Application Priority Data
Jul. 9, 2002  (JP) .............................. 2002-200150

(51) Int. Cl.
*G01B 5/20* (2006.01)
(52) U.S. Cl. ............................. 73/105; 33/503; 33/551; 33/554; 33/555; 33/556; 33/558; 33/559; 33/561
(58) Field of Classification Search .................. 33/503, 33/551, 553–556, 558, 559, 561; 73/105
See application file for complete search history.

(56) References Cited

U.S. PATENT DOCUMENTS
6,307,084 B1 *  10/2001  Matsuki et al. ............... 33/553

FOREIGN PATENT DOCUMENTS

| DE | 100 00 250 A1 | 8/2000 |
|---|---|---|
| DE | 100 35 714 A1 | 7/2001 |
| EP | 0 858 015 A1 | 8/1998 |
| JP | 2001-99639 A | 4/2001 |
| JP | 2001-194105 A | 7/2001 |

* cited by examiner

*Primary Examiner*—Daniel S. Larkin
(74) *Attorney, Agent, or Firm*—Oliff & Berridge, PLC

(57) ABSTRACT

A surface profile measuring instrument for measuring a surface profile of a workpiece has: a probe having a stylus provided with a measuring portion for measuring a surface of a workpiece at a tip end thereof and a detector for outputting a detection signal which varies depending on a measurement condition between the surface of the workpiece and the measuring portion; a scanning mechanism for relatively moving the measuring portion along the surface of the workpiece; a memory (46) that stores a position information of the contact portion when the detection signal reaches a predetermined reference signal value; a vibration inclination angle calculator (51) that calculates a response variation factor (vibration inclination angle θ) that applies variation to the detection signal from the surface of the workpiece; and a profile processor (53) that corrects the position information to obtain an actual profile of the surface of the workpiece using the response variation factor.

9 Claims, 19 Drawing Sheets

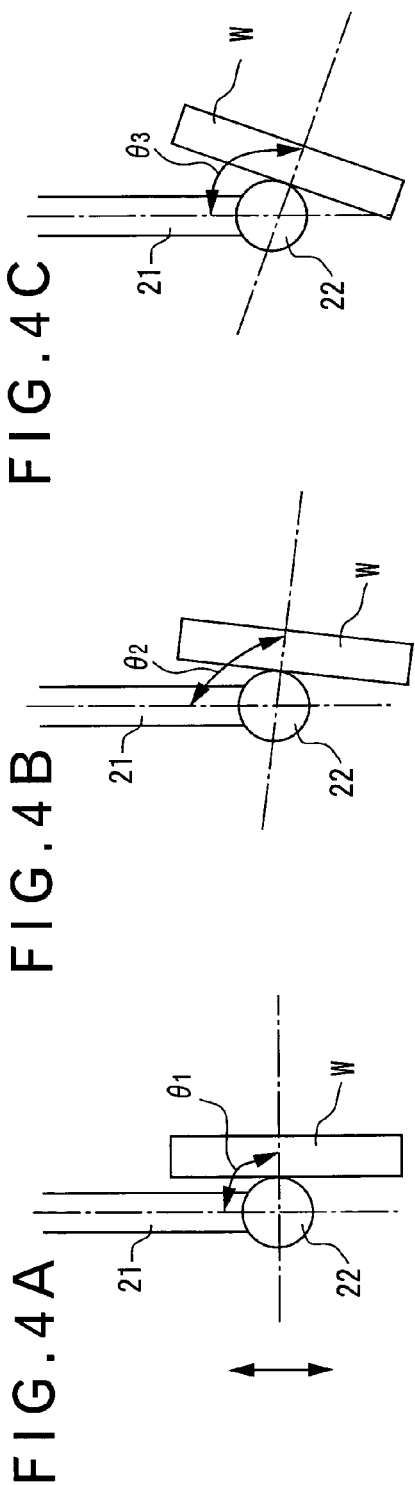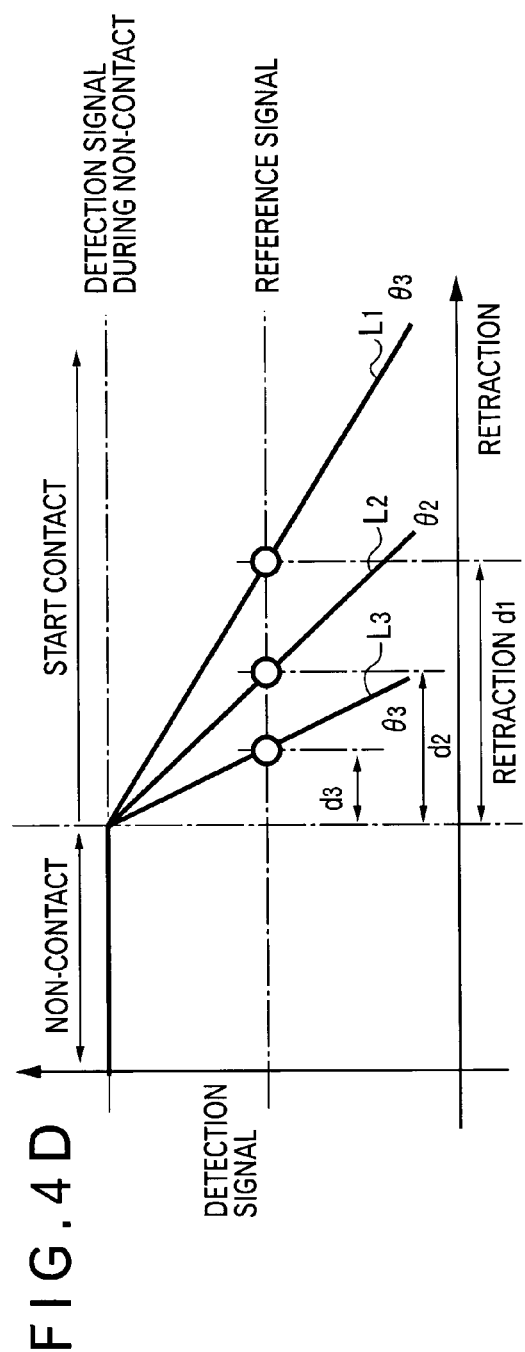
FIG. 4A  FIG. 4B  FIG. 4C  FIG. 4D

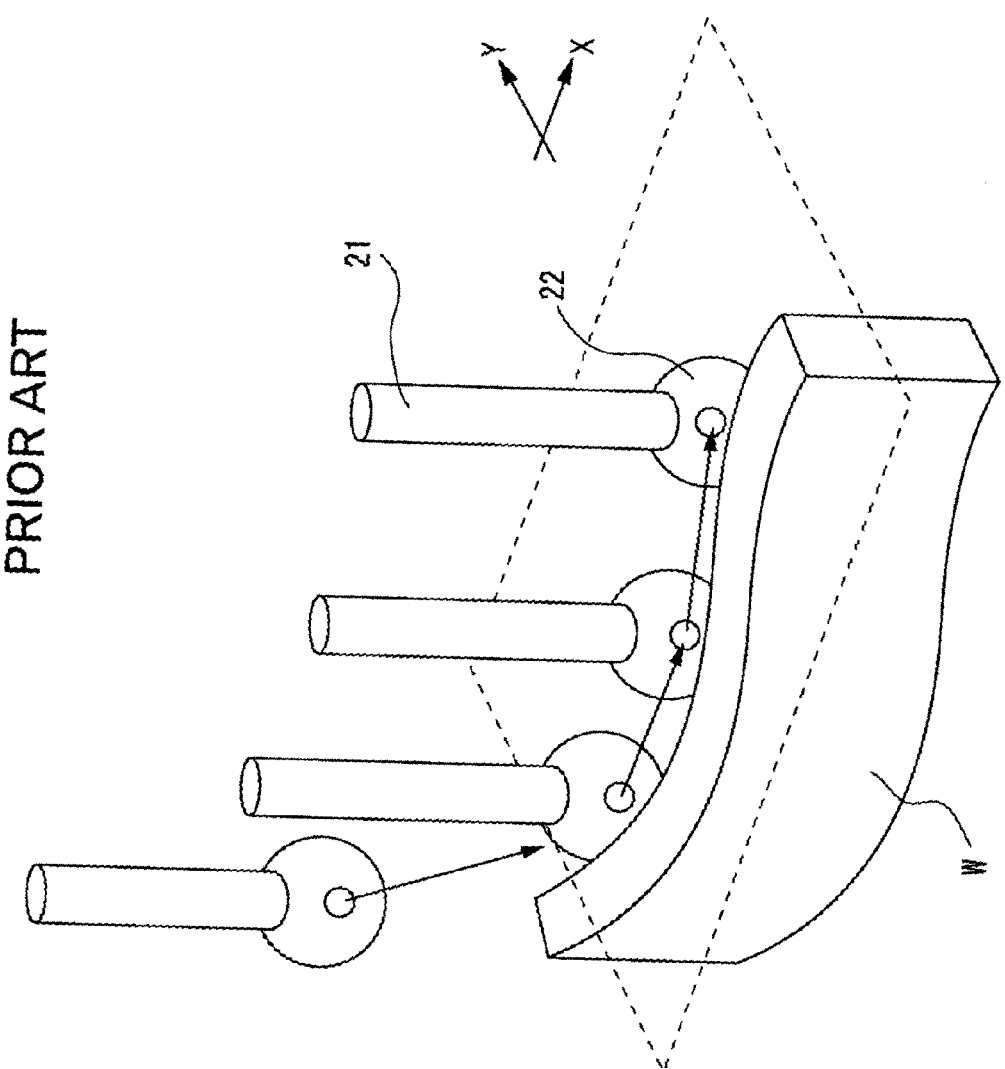

FIG. 17A  FIG. 17B  FIG. 17C
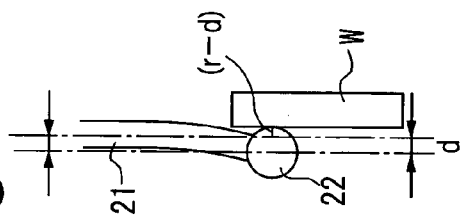
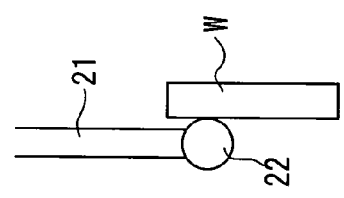
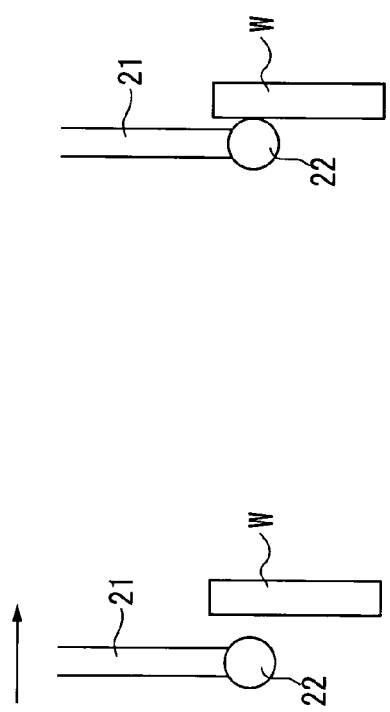
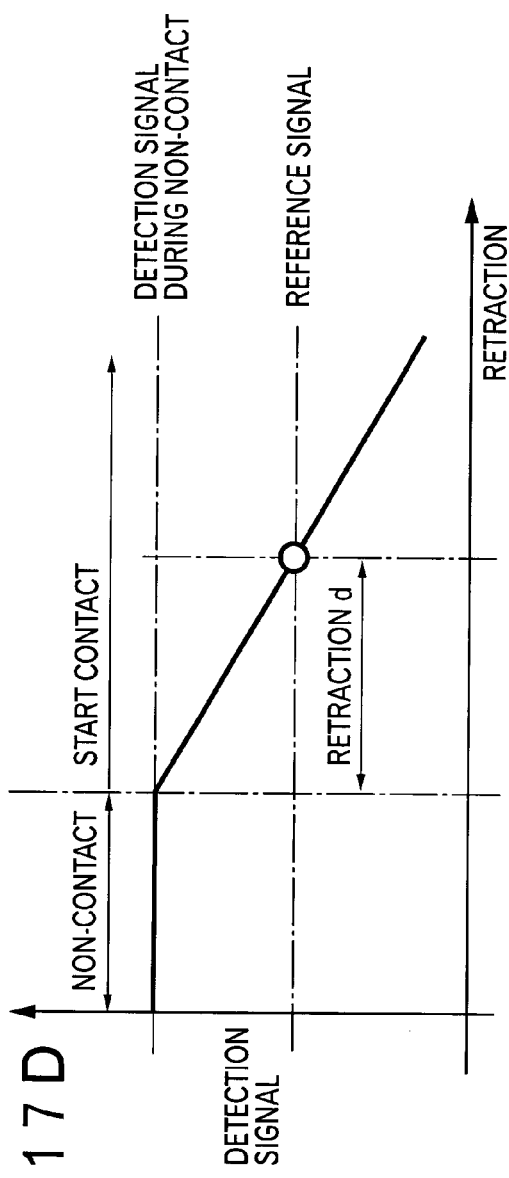
FIG. 17D

SURFACE PROFILE MEASURING INSTRUMENT AND SURFACE PROFILE MEASURING METHOD

BACKGROUND OF THE INVENTION

1. Field of the Invention

The present invention relates to a surface profile measuring instrument and a surface profile measuring method. Specifically, it relates to a surface profile measuring instrument and surface profile measuring method for continuously autonomic-measuring a surface profile of a workpiece by scanning and profiling the surface of the workpiece by a probe.

2. Description of Related Art

A surface profile measuring instrument that measures a profile of a surface of a workpiece with a contact probe attached to a coordinates measuring machine has been known, the instrument continuously measuring the surface profile of a workpiece by scanning and profiling the surface of a workpiece with a tip end of a stylus.

As shown in FIG. 14, a conventional surface profile measuring instrument 1 has a contact probe 2 having a contact portion 22 to be in contact with a surface of a workpiece W, a drive mechanism 3 for moving the contact probe 2 in X, Y and Z directions, and a controller 4 that controls the movement of the contact portion 22 of the contact probe 2 through the drive mechanism 3.

As shown in FIG. 15, the contact probe 2 has a stylus 21 having the contact portion 22 at a tip end thereof, a stylus holder 23 that holds the stylus 21, a vibrator provided on the stylus holder 23 for vibrating the stylus 21 in the axial direction, and a vibration detector 27 that detects the variation in the vibration of the stylus 21 to output a detection signal. The contact portion 22 is a sphere having radius r.

The drive mechanism 3 uses a slide mechanism capable of slide movement in X, Y and Z directions used in conventional coordinates measuring machine. For the convenience of description, Z-axis is set parallel to the stylus 21 in FIG. 14. Further, X and Y-axes are set on a plane orthogonal with the stylus 21. The X, Y and Z slide mechanisms respectively have a linear encoder (not shown) for measuring drive amount in respective directions.

The controller 4 has a scanning mechanism for moving the contact portion 22 while scanning along workpiece surface so that the detection signal from the vibration detector 27 becomes a predetermined reference signal value, and a profile processor for calculating the surface profile of the workpiece based on the position information of the contact portion 22 when the detection signal from the vibration detector 27 becomes the reference signal value.

In thus arranged surface profile measuring instrument 1, surface profile of a plane parallel to Z-axis is measured on X-Y plane as shown in FIG. 16.

The contact portion 22 is moved along the surface of a workpiece W according to the command of the scanning mechanism. The drive amount of the drive mechanism in X, Y and Z directions is measured by the linear encoder to obtain the position information of the contact portion 22.

When the contact portion 22 is moved in a scanning manner, the detection signal varies in accordance with relative position between the contact portion 22 and the surface of the workpiece. The positional relationship between the contact portion 22 and the workpiece surface and detection signal varying in accordance with the positional relationship are shown in FIG. 17(D).

When the contact portion 22 is remote from the workpiece W as shown in FIG. 17(A), the vibration of the contact portion 22 is not restricted and the detection signal becomes the maximum. A pressing force is applied to the contact portion 22 when the probe 2 is moved by the drive mechanism 3 and the stylus 21 is bent as shown in FIG. 17(C) after the contact portion 22 comes into contact with the workpiece surface as shown in FIG. 17(B).

The vibration of the contact portion 22 is restricted by the pressing force applied by the workpiece W to decrease the level of the detection signal. The detection signal varies according to sensitivity characteristics dependent on the pressing force applied from the workpiece surface to the contact portion 22. The detection signal reaches a reference signal value when the flexure (retraction d) of the stylus becomes a predetermined value as shown in FIG. 17(C).

The drive amounts of the drive mechanism in X, Y and Z-axes are sampled when the detection signal reaches the reference signal value. Then, the position information of the contact portion 22 when the detection signal reaches the reference signal value can be obtained.

The surface profile of the workpiece W can be measured by profile processing using the position information of the contact portion by the profile processor.

The example shown in FIG. 16 will be schematically described using FIG. 20. FIG. 20 represents output of the detection signal. In the present example, it is assumed that the measurement surface of the workpiece W is parallel to Z-axis.

When measurement start command is sent to the controller 4, surface profile measurement is started.

Initially, the contact portion 22 is moved from a point P0 where the contact portion 22 is not in contact with the surface of the workpiece W in a direction to be brought into contact with the workpiece according to an approach vector (step 1). In the present example, the approach direction is aligned with the Y-axis.

After step 1, the contact portion 22 is in contact with the measurement surface of the workpiece W and the detection signal reaches the reference position signal value (reference signal value) at point P1.

When the detection signal reaches the reference signal value, the contact portion 22 is moved in accordance with a prior-movement vector having a predetermined orientation relative to the approach vector (in perpendicular direction in the present instance) (step 2).

At this time, the detection signal varies when the contact portion 22 is forcibly pressed to the workpiece W on account of irregularity on the surface of the workpiece W (point P2).

When the detection signal varies, the contact portion 22 is moved by a correction vector having a predetermined orientation relative to the prior-movement vector (in perpendicular direction in the present instance) (step 3).

When the detection signal reaches the reference signal value by the movement of the contact portion 22 in step 3 (point P3), a scanning vector having a predetermined magnitude is generated in a direction connecting the points P1 and P3 and the contact portion 22 is moved according to the scanning vector (step 4).

Subsequently, when the contact portion 22 is moved in accordance with the correction vector having a predetermined orientation and the detection signal reaches the reference signal value (point P5), the scanning vector having a predetermined magnitude is generated in a direction connecting the points P3 and P5 and the scanning measurement of the measurement surface of the workpiece W is conducted in a similar manner.

Incidentally, the position information of the contact portion 22 when the detection signal reaches the reference signal value is a position measured by drive amount of the drive mechanism 3.

FIG. 18 shows the relationship between the contact portion 22 and the workpiece surface when the detection signal reaches the reference signal value. Solid line shows an actual position of the contact portion 22 when the contact portion touches the workpiece surface. Coordinates of the center of the contact portion 22 at the actual position is represented as x0. It is preferable that the coordinates of the center of the contact portion 22 is sampled at the actual position, however, the probe 2 has to be forcibly pressed by a predetermined retraction d before the detection signal reaches the reference signal value. Dotted line shows imaginary position of the contact portion 22 when the contact portion 22 is pressed by the retraction d relative to the actual position. The coordinates of the center of the contact portion 22 (i.e. coordinates of the center of the stylus 21) is represented as X. The coordinates X of the center of the contact portion 22 at the imaginary position is measured by the linear encoder of the drive mechanism 3 to be sampled.

In other words, the actual position x0 of the contact portion 22 when the detection signal reaches the reference signal value is located at a position where the position X measured by the encoder of the drive mechanism 3 is corrected by the retraction d, which can be represented as x0=X−d. Further, the surface profile of the workpiece to be measured is a contact point xp of the contact portion 22 with the workpiece surface, which can be represented as xp=x0+r.

Accordingly, in order to obtain the location of the contact point between the contact portion 22 and the workpiece surface (i.e. xp) based on the position information of the contact portion 22 measured by the encoder of the drive mechanism 3 (i.e. X), correction formula: xp=X+r−d, is used.

The surface profile of the workpiece W can be measured by sampling the position information of the contact portion 22 when the detection signal reaches the reference signal value and processing the position information.

As described above, when a surface parallel to the vibrating direction of the contact portion 22 is measured, the detection signal reaches the reference signal value when the probe 2 is pressed to the workpiece W by the retraction d.

However, as shown in FIG. 19 for instance, when a surface of a workpiece W having inclination relative to the vibration of the contact portion 22 is measured, the vibration of the contact portion 22 is further restricted by the workpiece surface as compared to the condition shown in FIG. 18. Then, the relationship between the detection signal and the retraction is changed according to the inclination angle. In the instance shown in FIG. 19, the detection signal reaches the reference signal value before the retraction d is reached. As a result, the position information of the contact portion 22 is sampled before reaching the retraction d. In this case, the surface profile of the workpiece cannot be correctly obtained even after correcting the position information of the contact portion 22 when the detection signal reaches the reference signal value by the constant retraction d.

Further, when the measurement surface of the workpiece W is parallel to the Z-axis (the instance shown in FIG. 20), the contact point of the contact portion 22 against the workpiece W may not be located in the direction of the correction vector on the X-Y plane passing the center of the contact portion 22, so that the surface profile of the workpiece may be correctly measured by correction with constant retraction d.

As described above, since the relationship between the detection signal and the retraction (sensitivity characteristics) varies in accordance with the angle formed by the vibration of the contact portion 22 and the measurement surface of the workpiece, the surface profile of a workpiece being inclined relative to the vibration of the contact portion 22 may not be correctly measured.

Further, even when the sensitivity characteristics does not change, when the contact point between the contact portion 22 and the workpiece W is not located in the direction of the correction vector, the contact position cannot be correctly obtained, so that the surface profile of such workpiece also cannot be obtained.

The above problem is not restricted to a vibration-type probe 2, but also applied to a profiling probe that detects the contact between the contact portion 22 and the workpiece W by measuring the distortion of the stylus 21. Specifically, the relationship between the retraction of the probe 2 and the distortion of the stylus 21 varies in accordance with the angle formed between the stylus and the workpiece surface or between the correction vector and the workpiece surface. As a result, the surface profile of the workpiece W being inclined relative to the shaft of the stylus 21 or the correction vector cannot be correctly measured.

Such problem also occurs when surface profile of a workpiece is measured with a non-contact probe. For instance, the sensor head of an electrostatic capacitance probe disclosed in Japanese Patent Laid-Open Publication No. 2001-194105 has a sensor electrode and a reference electrode arranged in a ring surrounding the sensor electrode. When the sensor electrode of such sensor head is driven by a high-frequency signal, the high-frequency signal changes in accordance with the distance between the sensor head and the measurement surface of the workpiece (i.e. electrostatic capacitance) to cause a change in terminal voltage of the sensor electrode. Accordingly, the distance gap between the sensor head and the measurement surface can be measured by detecting the terminal voltage of the sensor electrode.

Such electrostatic capacitance requires that the sensor head normally opposes to the workpiece surface (i.e. opposes to the workpiece along normal line direction of the surface) in measuring the workpiece. This is because, when the sensor head is not in normal opposing condition relative to the workpiece surface, electrostatic capacitance between the portion around the tip end of the sensor head and the measurement surface is not uniformly distributed, which results in the change in the sensitivity characteristics, so that the distance gap cannot be correctly measured. In other words, when such non-contact probe is used in a scanning measurement where the workpiece surface may not be constantly in normal-opposing condition relative to the sensor head, the surface profile of the workpiece may not be correctly measured.

SUMMARY OF THE INVENTION

An object of the present invention is to provide a surface profile measuring instrument and profile measuring method capable of overcoming the above disadvantages and correctly measuring a surface profile of a workpiece.

A surface profile measuring instrument according to an aspect of the present invention is for measuring a surface profile of a workpiece, the surface profile measuring instrument including: a probe having a stylus provided with a measuring portion for measuring a surface of a workpiece at a tip end thereof and a detector for outputting a detection signal which varies depending on a measurement condition between the surface of the workpiece and the measuring portion; a scanning mechanism for relatively moving the measuring portion along the surface of the workpiece; a sampling unit that samples position information of the measuring portion when the detection signal reaches a predetermined reference signal value; a response variation factor calculator for calculating a response variation factor that applies variation to a response of the detection signal from the surface of the workpiece; and a profile processor that corrects the position information to obtain an actual profile of the surface of the workpiece using the response variation factor.

In the above arrangement, the measuring portion is moved by the scanning mechanism along the workpiece surface. The scanning mechanism may be a three-dimensional drive mechanism to which the probe is attached.

When the measuring portion is moved while scanning the workpiece surface, the measurement condition between the workpiece surface and the measuring portion is transmitted to the detector through the measuring portion to be outputted as a variation in the detection signal. Based on the detection signal, the sampling unit samples the position information of the measuring portion when the detection signal reaches the predetermined reference signal value determining that the measuring portion and the workpiece surface are at the measurement condition.

The sampling unit may be a drive amount measuring means such as a linear encoder provided on the respective drive shaft of the three-dimensional drive mechanism. In this case, the position information to be sampled is obtained by the drive amount of the respective drive shafts.

Though the position information of the measuring portion is sampled when the detection signal reaches the reference signal value, the position information of the measuring portion does not represent the actual profile of the workpiece surface. Accordingly, the position information of the measuring portion has to be corrected into the surface profile of the workpiece. Specifically, the position information of the measuring portion has to be corrected as the measuring point of the measuring portion and the workpiece surface.

On the other hand, though the detection signal varies in accordance with the measurement condition between the workpiece surface and the measuring portion, the response variation changes in accordance with various factors for transmitting the measurement condition from the workpiece surface to the measuring portion (response variation factor). Accordingly, even when the detection signal is equal to the reference signal value, the measurement condition between the workpiece surface and the measuring portion cannot be uniquely determined.

When the position information of the measuring portion is corrected as the surface profile of the workpiece, it is considered that accurate correcting calculation is possible by conducting calculation suitable for the measurement condition between the workpiece surface and the measuring portion according to the response variation factor.

The present invention has been reached based on the above technical idea, where the response variation factor that applies variation to the response of the detection signal from the workpiece surface is calculated by the response variation factor calculator. The response variation factor may be, for instance, measuring point deviation (length and angle) between the measuring point on the workpiece surface and the standard measuring point of the measuring portion.

The profile processor corrects the position information of the measuring portion into the actual profile of the workpiece surface in accordance with the measurement condition between the measuring portion and the workpiece surface, thereby accurately obtaining the surface profile of the workpiece.

According to the present invention, since the response variation factor calculator is provided, the response variation factor that causes response variation of the detection signal when the detection signal becomes equal to the reference signal value can be calculated.

Further, the profile processor conducts correction processing in accordance with the response variation factor. Accordingly, considering the measurement condition between the measuring portion and the workpiece surface, the surface profile of the workpiece can be correctly obtained based on the position information of the measuring portion.

In the above arrangement, the response variation factor may preferably be a deviation between a measuring point on the surface of the workpiece when the detection signal reaches the reference signal value and a standard measuring point of the measuring portion, and the profile processor may preferably include a correction amount deriving unit that specifies a correction amount of the position information by the response variation factor.

When the measuring point deviation between the measuring point on the workpiece surface and the standard measuring point of the measuring portion can be determined as the response variation factor, the correction amount deriving unit calculates a probe correction amount from the time when the measurement of the workpiece surface is started to the time when the detection signal becomes equal to the reference signal value.

The profile processor corrects the position information sampled when the detection signal has reached the reference signal value considering the correction amount, so that the surface profile of the workpiece can be accurately obtained.

In the above arrangement, the correction amount deriving unit may preferably be a table storing a relationship between the correction amount and the response variation factor.

The variation of the detection signal when the deviation (response variation factor) between the measuring point on the workpiece surface and the standard measuring point of the measuring portion is varied is examined in advance. With reference to the relationship between the response variation factor and the detection signal, a table storing the correction amount before the detection signal reaches the reference signal value for various response variation factors is created.

The provision of the table allows derivation of the correction amount corresponding to a response variation factor once the response variation factor is determined. Accordingly, the surface profile of the workpiece can be accurately obtained by correcting the position information of the measuring portion in accordance with the correction amount.

Incidentally, when the response variation factor is not stored in the table in advance, the correction amount can be determined by interpolation or extrapolation.

In the above arrangement, the correction amount deriving unit may preferably be a correction amount calculating formula that calculates the correction amount based on the response variation factor.

The variation of the detection signal when the angle formed between the workpiece surface and the vibrating direction of the contact portion (response variation factor) varies is examined in advance, and with reference to the relationship between the response variation factor and the detection signal, a relational formula (correction amount calculating formula) for calculating the correction amount at which the detection signal reaches the reference signal value for various response variation factor is obtained.

The provision of the correction amount calculating formula allows derivation of the correction amount corresponding to a response variation factor once the response variation factor is determined. Accordingly, the surface profile of the workpiece can be accurately obtained by correcting the position information of the measuring portion with reference to the correction amount.

The measuring point deviation when the detection signal reaches the reference signal value may preferably be calculated on the basis of a normal line of a profile vector connecting a first position information of the measuring portion when the detection signal reaches the reference signal value and a second position information of the measuring portion when the detection signal precedingly reached the reference position signal value.

The vector (profile vector) generated connecting the position information of the measuring portion sampled when the detection signal reaches the reference signal value reflects the surface profile of a workpiece. Accordingly, the measuring point of the workpiece surface can be set on the straight line passing the point indicated by the first position information and orthogonal with the profile vector.

Then, the measuring point deviation (response variation factor) between the measuring point of the workpiece surface and the standard measuring point of the measuring portion can be obtained. The surface profile of the workpiece can be accurately obtained by determining the correction amount from the response variation factor and correcting the position information.

In the above surface profile measuring instrument, the probe may preferably be a contact probe having a contact portion as the measuring portion, and the detector may preferably have a vibrator that vibrates the contact portion in one direction and a vibration detector that detects a variation in the vibration of the contact portion.

According to the above arrangement, the contact portion is vibrated in one direction by the vibrator. When the contact portion touches the workpiece surface, the vibration of the contact portion is restricted by the pressing force from the workpiece. The vibration detector monitors the variation of the vibration of the contact portion, which converts the vibration energy into an electric signal to output as a detection signal, so that the contact between the contact portion and the workpiece surface can be detected.

The response variation factor may preferably be an angle formed between the measuring point of the surface of the workpiece when the detection signal reaches the reference signal value and the vibrating direction of the contact portion, and the profile processor may preferably have a correction amount deriving unit that determines a correction amount based on the response variation factor, the correction amount being a variation amount of the position information from the time when the contact portion starts touching the surface of the workpiece to the time when the detection signal reaches the reference signal value.

When the contact portion touches the workpiece surface while vibrating the contact portion in one direction, the restriction of the vibration of the contact portion varies according to the angle in which the workpiece surface is in contact with the vibration of the contact portion, which results in response variation of the detection signal.

For instance, when the workpiece surface is parallel to the vibrating direction, the force for restricting the vibration is weak. In this case, the detection signal reaches the reference signal value when the contact portion is strongly pressed onto the workpiece surface. In other words, the detection signal reaches the reference signal value after the contact portion starts contacting the workpiece surface and the probe is further moved closer to the workpiece (i.e. when the probe is forcibly pressed).

Further, when the workpiece surface is perpendicular to the vibrating direction, great force is applied for restricting the vibration, so that the detection signal reaches the reference signal value when the contact portion slightly touches the workpiece surface.

Accordingly, with reference to the position information of the contact portion sampled when the detection signal reaches the reference signal value, the angle formed between the vibrating direction of the contact portion and the measuring point on the workpiece surface is obtained as the response variation factor.

By obtaining the angle formed between the vibrating direction of the contact portion and the measuring point on the workpiece surface, the influence of the workpiece surface on the vibration of the contact portion, i.e. the response variation of the detection signal can be determined.

When the response variation factor is determined, the probe correction amount from the time when the contact portion starts touching the surface of the workpiece to the time when the detection signal reaches the reference signal value is derived by the correction amount deriving unit. With reference to the correction amount, the position information sampled when the detection signal reaches the reference signal value is corrected, thereby accurately obtaining the surface profile of the workpiece.

The vibrating direction of the contact portion may preferably be aligned with the axial direction of the stylus, and the profile movement mechanism may preferably move the measuring portion within a plane including the axis of the stylus.

According to the above arrangement, a profile vector connecting a first position information of the measuring portion when the detection signal reaches the reference signal value and a second position information of the measuring portion when the detection signal precedingly reached the reference position signal value is calculated. Since the measuring point on the workpiece exists on a straight line orthogonal with the profile vector and passing the point indicated by the first position information, so that the response variation factor can be calculated by obtaining the orthogonal straight line and the vibrating direction of the contact portion.

Since the contact portion is moved within a plane including the axial direction of the stylus as the vibrating direction of the contact portion, the profile vector generated by the current and precedingly sampled position information and the vibrating direction of the contact portion are on the same plane. In other words, the profile vector reflects the surface profile of the workpiece surface directly restricting the vibration of the contact portion. Accordingly, the measuring point of the workpiece surface exists on the straight line orthogonal with the profile vector and passing the point indicated by the first position information, so that the angle formed by the straight line and the vibrating direction of the contact portion bears significance as the response variation factor.

A surface profile measuring method according to another aspect of the present invention is for measuring a surface profile of a workpiece, the method comprising the steps of: providing a probe having a stylus provided with a measuring portion for measuring a surface of a workpiece at a tip end thereof and a detector for outputting a detection signal which varies depending on a measurement condition between the surface of the workpiece and the measuring portion; relatively moving the measuring portion along the surface of the workpiece while scanning; sampling a position information of the measuring portion when the detection signal reaches a predetermined reference signal value; calculating a response variation factor that applies variation to the detection signal from the surface of the workpiece when the detection signal reaches the reference signal value; and correcting the position information using the response variation factor to obtain an actual profile of the surface of the workpiece.

According to the above arrangement, since the step for calculating response variation factor is provided, the response variation factor that causes response variation of the detection signal when the detection signal becomes equal to the reference signal value can be calculated. Further, the correction processing in accordance with the response variation factor is conducted during the step for profile processing. Accordingly, considering the measurement condition between the measuring portion and the workpiece surface, the surface profile of the workpiece can be correctly obtained based on the position information of the measuring portion.

A surface profile measuring instrument according to still another aspect of the present invention is for measuring a surface profile of a workpiece, the instrument comprising: a probe having a stylus provided with a measuring portion for measuring a surface of a workpiece at a tip end thereof and a detector for outputting a detection signal which varies depending on a measurement condition between the surface of the workpiece and the measuring portion; a scanning mechanism for relatively moving the measuring portion along the surface of the workpiece; a sampling unit that samples position information of the measuring portion when the detection signal reaches a predetermined reference signal value; a response variation factor calculator for calculating a response variation factor that applies variation to a response of the detection signal from the surface of the workpiece; and a reference position signal value calculator for calculating a reference position signal value indicating the value of the detection signal that indicates that the relative position between the measuring portion and the surface of the workpiece reaches a reference position.

According to the above arrangement, when the measuring portion is moved along the workpiece surface, the position information of the measuring portion is sampled when the relative position of the measuring portion and the workpiece surface becomes a reference position based on the detection signal. The surface profile of the workpiece can be obtained by correcting the position information by a predetermined correction formula considering that the measuring portion and the workpiece surface are on the reference position.

Incidentally, the response of the detection signal varies in accordance with the manner how the workpiece surface touches the measuring portion.

Accordingly, the response variation factor that causes the response variation of the detection signal is calculated by the response variation factor calculator.

Under the calculated response variation factor, the value of the detection signal (reference position signal value) outputted when the measuring portion and the workpiece surface are at the reference position is calculated by the reference position signal value calculator. The position information of the measuring portion is sampled when the detection signal reaches the calculated reference position signal value, so that, since the measuring portion and the workpiece surface are on the reference position, the surface profile of the workpiece can be obtained by correcting the position information according to a predetermined correction formula.

According to the above aspect of the present invention, the response variation factor that applies variation to the response of the detection signal is determined and the value of the detection signal (reference position signal value) when the relative position of the measuring portion and the workpiece surface are on the reference position under the determined response variation factor can be calculated, so that the position information of the measuring portion can be processed by a predetermined correction formula.

A surface profile measuring instrument according to further aspect of the present invention is for measuring a surface profile of a workpiece, the instrument comprising: a probe having a stylus provided with a measuring portion for measuring a surface of a workpiece at a tip end thereof and a detector for outputting a detection signal which varies depending on a measurement condition between the surface of the workpiece and the measuring portion; a scanning mechanism for relatively moving the measuring portion along the surface of the workpiece; a sampling unit that samples position information of the measuring portion when the detection signal reaches a predetermined reference signal value; and a profile processor that corrects the position information to obtain an actual profile of the surface of the workpiece using the response variation factor, the profile processor determining a measuring point of the workpiece based on a profile vector connecting a first position information of the measuring portion when the detection signal reaches the reference signal value and a second position information of the measuring portion when the detection signal precedingly reached the reference position signal value.

According to the above arrangement, when the measuring portion at the end of the stylus is relatively moved along the workpiece surface by the scanning mechanism, the response of the detection signal varies depending on the measuring condition between the measuring portion and the workpiece surface. Then, the first position information of the measuring portion is sampled when the detection signal reaches the predetermined reference signal value, and the measuring portion is relatively moved by a predetermined distance, where the second position information of the measuring portion when the detection signal reaches the predetermined reference signal value is sampled. The profile vector is generated by the first and the second position information. After repeating such scanning movement, the generated profile vectors reflects the surface profile of the workpiece.

Accordingly, it can be assumed that the measuring point of the workpiece surface lies in a direction orthogonal with the respective profile vectors and orthogonal with the end position of the profile vector (the point indicated by the first position information). Therefore, when a probe having a deviation between the sampled position information and the measured point on the workpiece surface is used, the measuring point of the workpiece can be accurately determined by correcting the deviation in the above orthogonal direction to obtain the actual profile.

BRIEF DESCRIPTION OF THE DRAWINGS

FIG. 4 is an illustration of response variation of a detection signal in accordance with the vibrating direction of the contact portion and the position of the workpiece surface of the first embodiment;

FIG. 16 is an illustration showing a conventional scanning movement;

FIGS. 17(A) to (D) are illustrations of variation in the detection signal in accordance with positional relationship between the contact portion and the workpiece surface;

DETAILED DESCRIPTION OF PREFERRED EMBODIMENT(S)

Preferred embodiments of the present invention will be described below with reference to attached drawings.

First Embodiment

Figure 14:
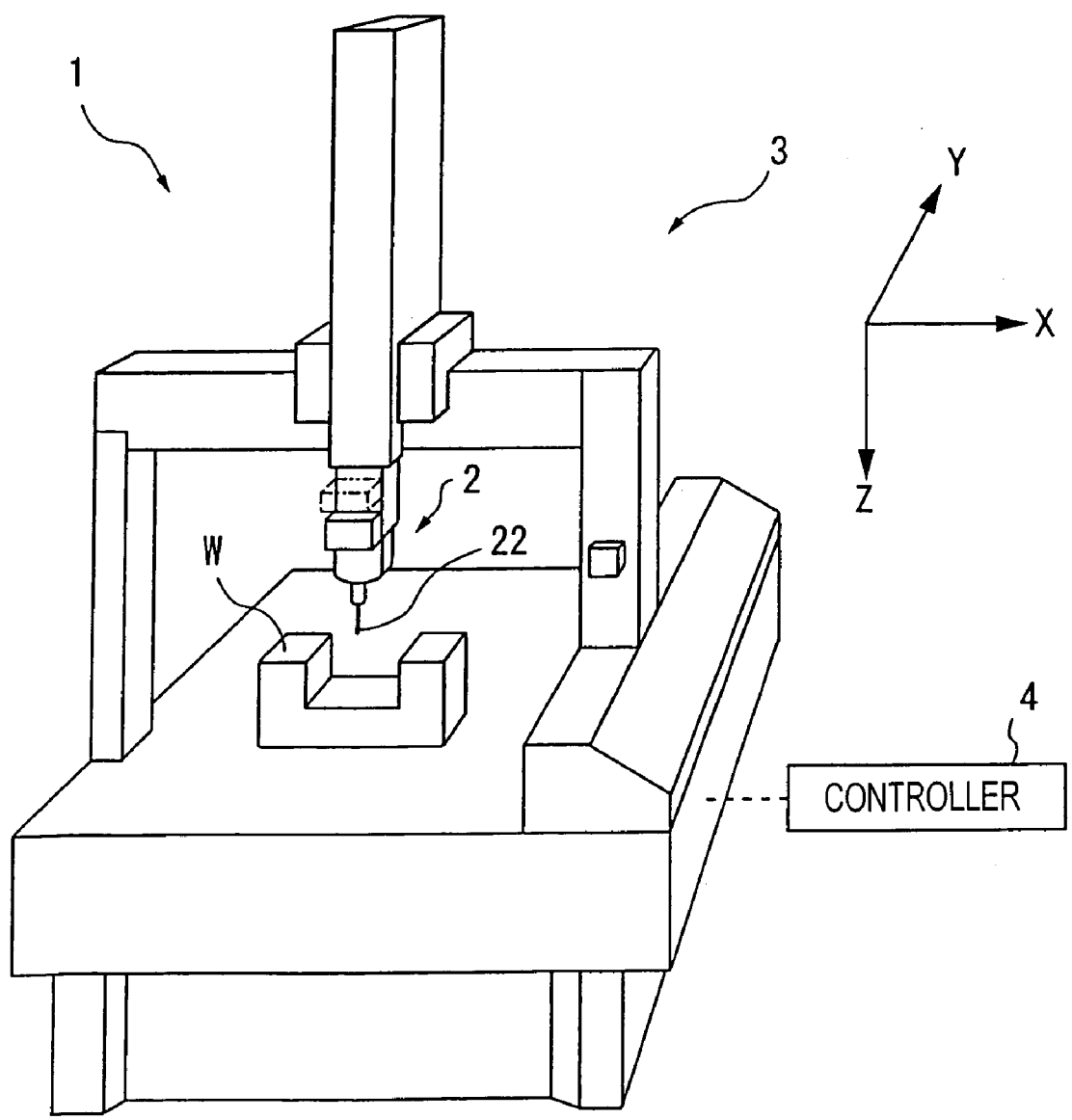
FIG. 14 is an illustration showing a coordinate measuring machine as a conventional surface profile measuring instrument.
Figure 15:
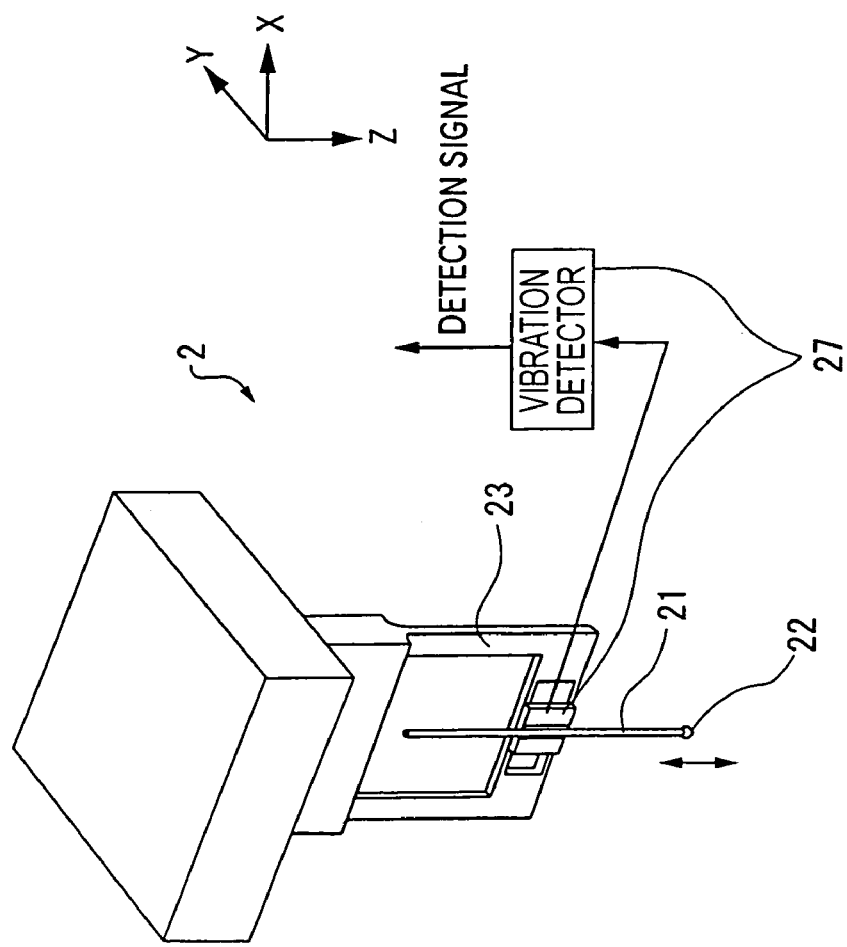
FIG. 15 is an illustration of a conventional vibration-type contact probe.
Figure 18:
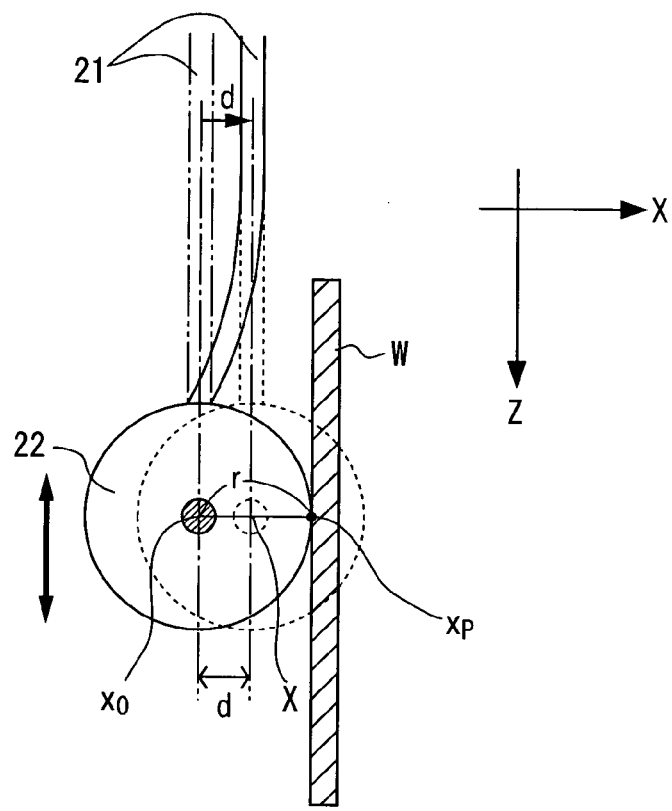
FIG. 18 is an illustration showing a relationship between the position of the contact portion and the retraction when the detection signal reaches the reference signal value.
Figure 19:
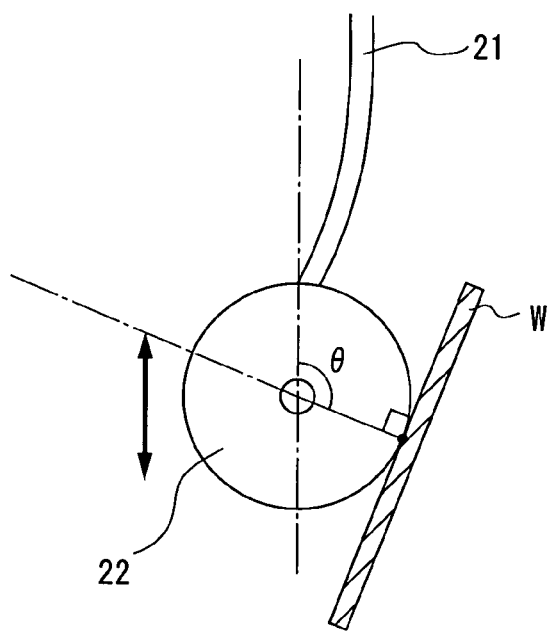
FIG. 19 is an illustration showing an arrangement where the workpiece surface is inclined relative to the vibration of the contact portion.
Figure 20:
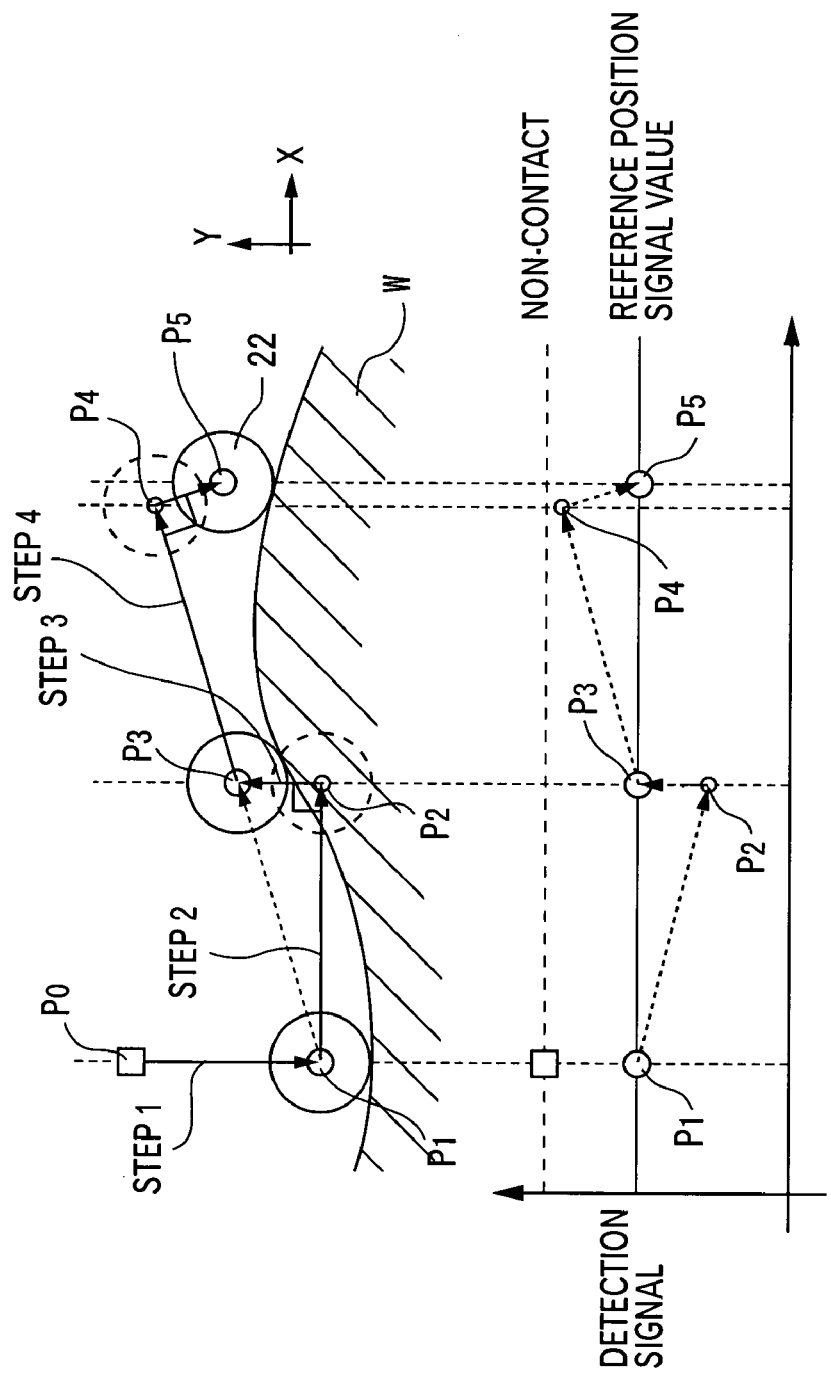
FIG. 20 is an illustration showing a principle of conventional scanning movement.

A first embodiment of a surface profile measuring instrument according to the present invention has approximately the same arrangement as the surface profile measuring instrument 1 shown in FIG. 14 described in the Related Art section except for the characteristic feature in the controller 4.

As shown in FIG. 14, the surface profile measuring instrument 1 has a contact probe 2 having a contact portion 22 to be in contact with the surface of a workpiece W, a drive mechanism 3 for moving the contact probe 2 relative to the workpiece W, and a controller 4 for controlling the drive mechanism 3.

For the convenience of describing the present invention, Z-axis is set in the axial direction of the stylus 21 (downward in FIG. 14), and X-Y plane is set orthogonal with the Z-axis.

The contact probe 2 may be the same as the probe described in the Related Art section.

The contact probe 2 has a stylus 21 having the contact portion 22 at the tip end thereof, a stylus holder 23 for holding the stylus 21, a vibrator 24 provided on the stylus holder 23 for vibrating the stylus 21 in the axial direction, and a vibration detector 27 for detecting the change in the vibration of the stylus 21 to output a detection signal.

The vibrator has a piezoelectric element 25 provided on the stylus holder 23, and a vibrating circuit 26 that generates a pulse signal for vibrating the piezoelectric element 25.

The vibration detector 27 has a piezoelectric element 28 provided on the stylus holder 23, and a detection circuit 29 for outputting the variation in the voltage caused in accordance with the change in the vibration of the piezoelectric element 28 as a detection signal. The vibrator 24 and the vibration detector 27 constitute a detector.

The contact portion is a sphere of radius r. The radius r of the contact portion is predetermined by calibration using measurement result of a master workpiece of which dimension is known.

The drive mechanism 3 moves the contact probe 2 in X, Y and Z directions to touch the workpiece W based on the command from the controller 4, which may be the conventional drive mechanism 3 used for conventional coordinate measuring machine.

A linear encoder (not shown) as a sampling means for sampling the position information of the contact portion 22 is provided on the respective axes. The linear encoder measures the drive amount of the respective axes, and the measured value is collected as the position information of the contact portion 22.

Figure 1:
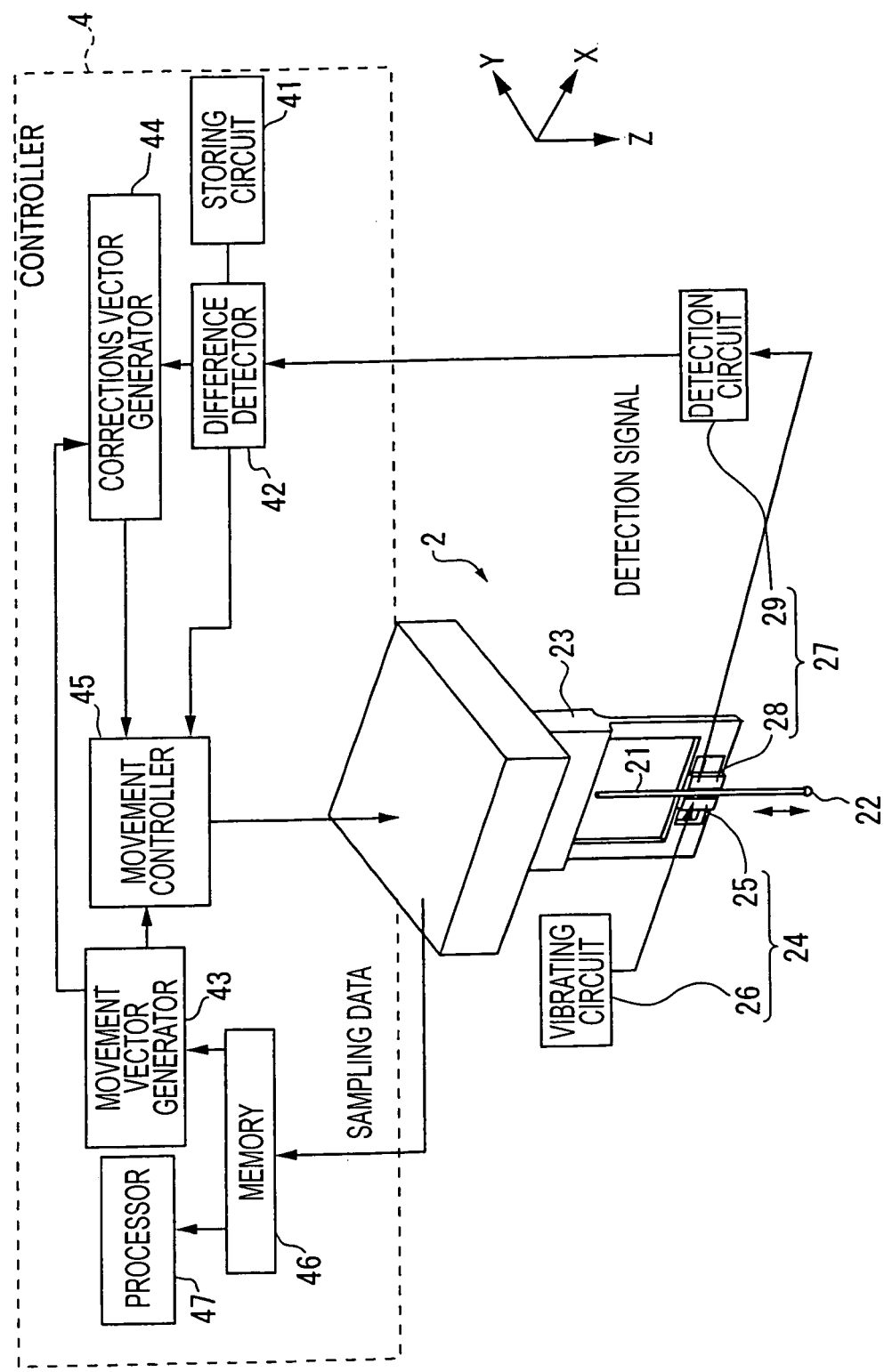
FIG. 1 is a block diagram of a controller of a first embodiment of a surface profile measuring instrument according to a first embodiment of the present invention.

As shown in FIG. 1, the controller 4 has a storing circuit 41, a difference detector 42, a movement vector generator 43, a correction vector generator 44, a movement controller 45, a memory 46 and a processor 47 as a profile processing means.

A reference signal value indicating the detection signal when the contact portion 22 touches the surface of the workpiece W by a predetermined pressing intensity (measuring force) is stored in the storing circuit 41 in advance.

The difference detector 42 compares the detection signal outputted by the detection circuit 29 with the reference signal value stored in the storing circuit 41, and, when the detection signal is equal to the reference signal value, outputs a sampling command to the movement controller 45 for sampling the position information of the contact portion 22. On the other hand, when the detection signal is not equal to the reference signal value, the difference detector 42 outputs a correction vector generating command for bringing the detection signal to be coincident with the reference signal value to the correction vector generator 44.

The movement vector generator 43 generates a movement vector that dictates the direction and magnitude of the movement of the contact portion 22 and outputs a movement vector command representing the movement vector to the movement controller 45.

The movement vector generator 43 generates an approach vector for moving the contact portion 22 from a position remote from the workpiece surface toward the workpiece surface (approach direction), a prior-movement vector for moving the contact portion 22 in a direction perpendicular to the approach direction (prior movement direction) after moving the contact portion 22 by the approach vector, and a scanning vector for moving the contact portion 22 in an extension direction (scanning direction) connecting the position information where the detection signal precedingly reached the reference signal value and the position information where the current detection signal has reached the reference signal value.

The orientation of the approach vector is determined prior to measurement. The magnitude of the prior-movement vector and the scanning vector is determined prior to measurement.

The orientation of the approach vector is not limited as long as the contact portion 22 can be in contact with the workpiece surface, which may preferably be along the normal line of the workpiece surface. In the present embodiment, for the convenience of describing the present invention, the orientation of the approach vector is aligned with X-axis direction and the orientation of the prior-movement vector is aligned with Z-axis direction, where the scanning measurement is conducted on the X-Z plane and the measurement surface of the workpiece W is constantly parallel to the Y-axis.

The magnitude of the prior-movement vector and the scanning vector can be set as desired in accordance with desired measurement accuracy and time.

The correction vector generator 44 receives the command from the difference detector 42 to generate a correction vector indicating the movement direction of the contact portion 22 so that the detection signal becomes the reference signal value. The generated correction vector is outputted to the movement controller 45 as the correction vector command.

The correction vector is vertically oriented relative to the vector generated by the movement vector generator 43.

The movement controller 45 receives the command from the difference detector 42, the movement vector generator 43 and the correction vector generator 44 to output a movement command to the drive mechanism 3.

The movement command includes a command for commanding the drive mechanism 3 to sample the position information of the contact portion 22 based on the sampling command from the difference detector 42, and another command for driving the drive mechanism 3 based on the movement vector command from the movement vector generator 43 and the correction vector command from the correction vector generator 44.

The movement vector generator 43, the correction vector generator 44, the movement controller 45 and the drive mechanism 3 constitute a scanning mechanism.

The memory 46 stores the position information of the contact portion 22 sampled based on the sampling command from the difference detector 42. The position information is outputted to the movement vector generator 43 and the processor 47 at a predetermined timing.

Figure 2:
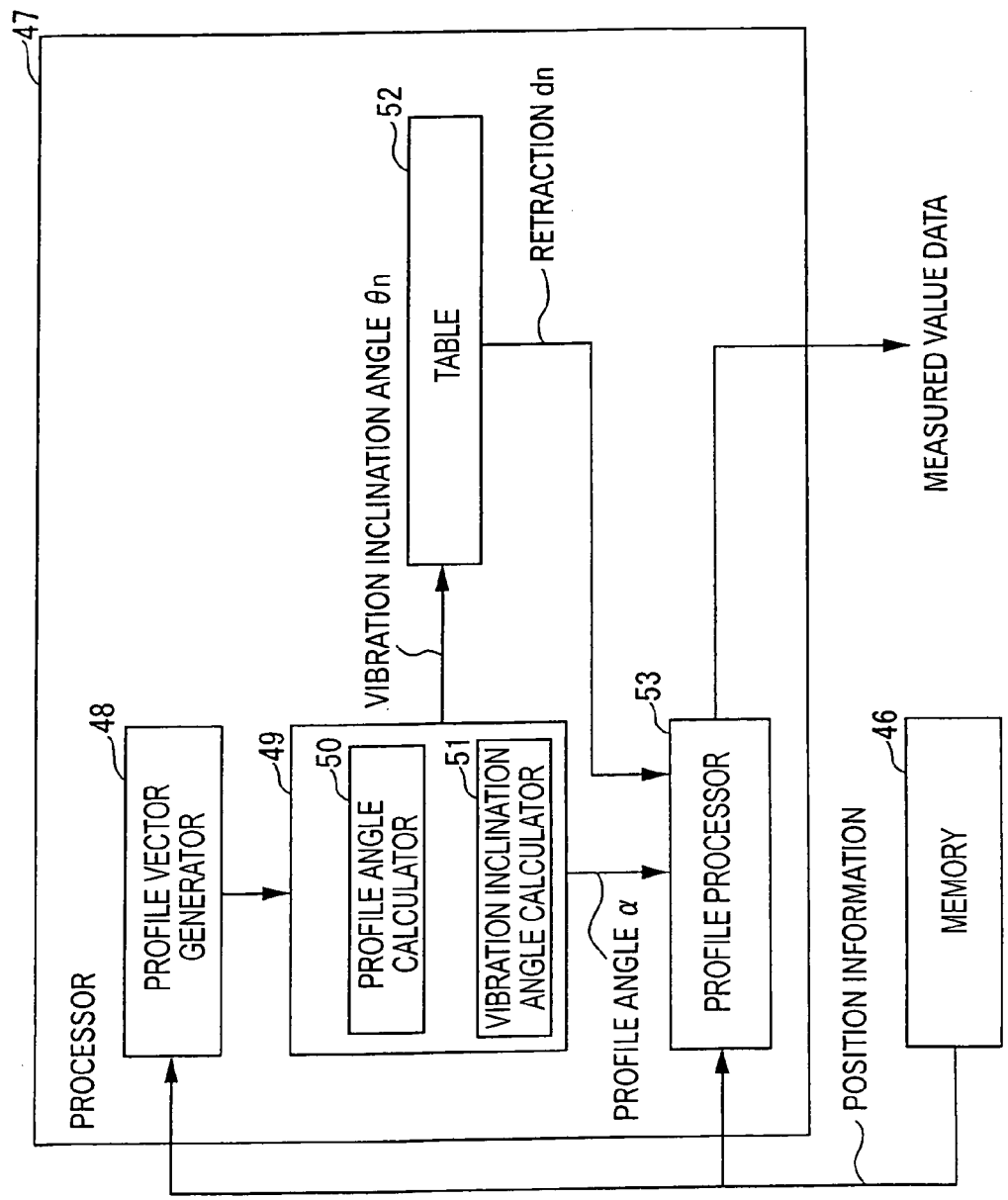
FIG. 2 is a block diagram showing an arrangement of a processor of the first embodiment.

As shown in FIG. 2, the processor 47 has a profile vector generator 48, an angle calculator 49, a table 52 that stores the relationship between retraction and vibration inclination angle, and a profile processor 53. The retraction indicates correction amount.

When the detection signal reaches the reference signal value, the profile vector generator 48 generates a vector connecting the position when the detection signal precedingly reached the reference signal value and the current position (profile vector).

Incidentally, succeeding scanning vector generated by the movement vector generator 43 is generated on the extension of the profile vector.

The angle calculator 49 has the profile angle calculator 50 for calculating an angle αn of the profile vector relative to the vibration of the contact portion 22, and a vibration inclination angle calculator 51 as a response variation factor calculator that calculates an angle (i.e. response variation factor) of the contact point on the workpiece surface relative to the vibrating direction of the contact portion 22.

The profile angle calculator 50 calculates the angle of the profile vector relative to the vibrating direction of the contact portion 22 (profile angle). In the present embodiment, since the vibrating direction of the contact portion 22 is aligned with the axis of the stylus 21 (Z direction), the angle between the profile vector and the stylus 21 is calculated as the profile angle.

Figure 3:
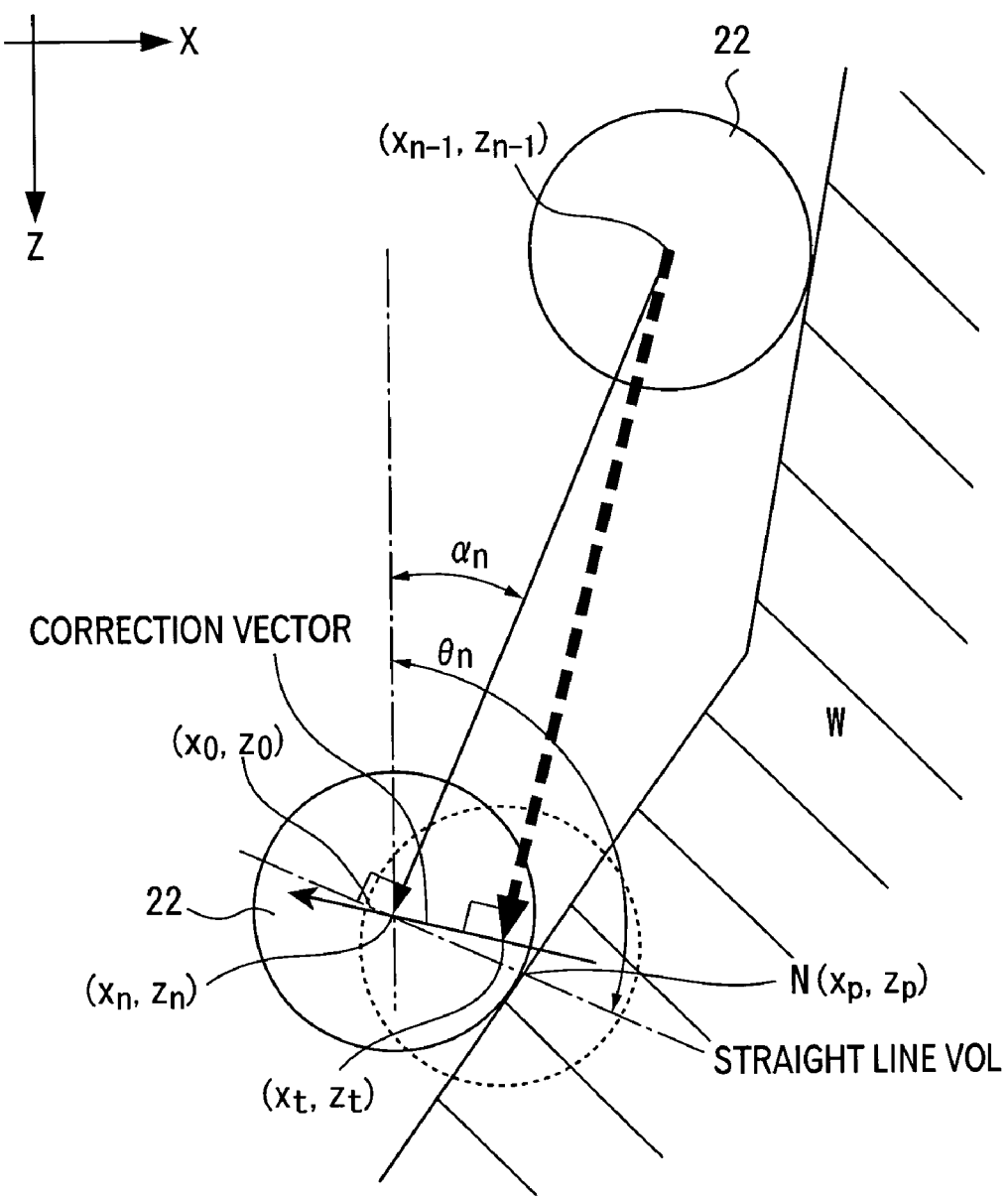
FIG. 3 is an illustration showing a relationship among position information of a contact portion, center coordinates of the contact portion, contact point of the contact portion against the workpiece surface, profile angle θ and vibration inclination angle θ of the first embodiment.

The profile angle αn is calculated as follows. As shown in FIG. 3, after the contact portion 22 moves from the point $(X_{n-1}, Z_{n-1})$ to the point (Xt, Zt) according to the scanning vector, the contact portion 22 is moved to a point (Xn, Zn) vertically located relative to the scanning vector by the correction vector. The detection signal reaches the reference signal value and sampling process is conducted at the point (Xn, Zn). Since the profile vector can be defined by the points $(X_{n-1}, Z_{n-1})$ and (Xn, Zn), the profile angle αn can be calculated as:

$$\tan \alpha n = (X_n - X_{n-1})/(Z_n - Z_{n-1})$$

The vibration inclination angle calculator 51 estimates the angle of the contact point on the workpiece surface relative to the vibrating direction of the contact portion 22.

Since the profile vector approximately reflects the surface profile of the workpiece W in the scanning direction of the contact portion 22, the vibrating inclination angle calculator 51 calculates the angle (vibration inclination angle θn) formed between the vibrating direction of the contact portion 22 and a straight line passing the point (Xn, Zn) and orthogonal with the profile vector on the plane defined by the vibrating direction of the contact portion 22 and the profile vector. However, the vibration inclination angle θn refers to an angle formed on the side of the workpiece W.

As shown in FIG. 3, the vibration inclination angle θn can be represented using the profile angle αn by: θn (vibration inclination angle)=αn (profile angle)+90°.

When the profile vector is parallel to the measurement surface of the workpiece W, the straight line VOL passing the point (Xn, Zn) and orthogonal with the profile vector is perpendicular to the measurement surface of the workpiece W and the point N (xp, zp) where the contact portion 22 touches the workpiece W is on the straight line VOL. However, as shown in FIG. 3, the profile vector is ordinarily not parallel to the measurement surface of the workpiece W and is slightly angled. Accordingly, the point N (xp, zp) where the contact portion 22 touches the workpiece W is slightly off the straight line VOL, so that the vibration inclination angle calculator 51 does not precisely calculate the angle of the contact point N (xp, zp) of the workpiece surface relative to the vibrating direction of the contact portion 22 and slight error is generated.

However, such error can be virtually ignored since the orientation of the profile vector can be made approximately parallel to the measurement surface of the workpiece W by reducing the magnitude of the scanning vector as required.

Incidentally, in the contact probe 2 of the present embodiment, measurement is conducted at "standard measurement point" where the contact probe 2 touches the workpiece W on a plane containing the center coordinates of the spherical contact portion 22 provided at the tip end of the stylus 21 (i.e. latitude 0°). Accordingly, when the contact portion 22 touches the surface of the workpiece W at a position off the plane (south latitude 30° for instance), the deviation (30°) represents measuring point deviation. In the present embodiment, since the vibration inclination angle is calculated based on the stylus axis, the vibration inclination angle is 90°. In other words, the standard measuring point of the contact probe 2 is a position where the vibration inclination angle is 90°.

The table 52 stores the relationship between the retraction dn and the vibration inclination angle θn when the detection signal reaches the reference signal value.

The retraction dn necessary for the detection signal to reach the reference signal value varies according to the manner how the workpiece surface touches the contact portion relative to the vibrating direction of the contact portion 22.

The relationship is shown in FIG. 4. FIG. 4(A) shows an arrangement where the normal line of the workpiece surface forms the vibration inclination angle θ1 (right angle) relative to the vibrating direction of the contact portion 22. FIG. 4(B) shows another arrangement where the normal line of the workpiece surface forms the vibration inclination angle θ2 (>θ1) relative to the vibrating direction of the contact portion 22. FIG. 4(C) shows still another arrangement where the normal line of the workpiece surface forms the vibration inclination angle θ3 (>θ2) relative to the vibrating direction of the contact portion 22.

FIG. 4(D) is an illustration showing the retraction dn and the response characteristics for each of the FIGS. 4(A), (B) and (C), which respectively show response characteristics L1 (4(A)), response characteristics L2 (4(B)), and response characteristics L3 (4(C)).

FIG. 4(D) shows that the force for restricting the vibration of the contact portion 22 is intensified and the retraction dn becomes smaller as the vibration inclination angle θn becomes steeper.

In other words, the retraction d1 for the vibration inclination angle θ1 is greater than the retraction d2 for the vibration inclination angle θ2, and the retraction d2 is greater than the retraction for the vibration inclination angle θ3.

The relationship between the vibration inclination angle θn and the retraction dn is stored in advance. The table 52 stores the relationship between the retraction dn and the vibration inclination angle θn.

In other words, when the vibration inclination angle θn calculated by the vibration inclination angle calculator 51 is inputted to the table 52, the retraction dn when the contact portion 22 is pressed to the workpiece W by the vibration inclination angle θn can be read out.

The profile processor 53 corrects the sampled position information considering the retraction dn, the vibration inclination angle θn, and the radius r of the contact portion 22 to calculate the actual profile of the workpiece surface.

The profile processor 53 calculates the center coordinates (x0, z0) using the position information of the contact portion 22 (Xn, Zn) and the retraction dn corresponding thereto.

As shown in FIG. 3, the center coordinates (x0, z0) of the contact portion 20 is located at a position displaced by retraction dn relative to the position (Xn, Zn) in the direction of the straight line VOL orthogonal with the profile vector. Accordingly, the formulae:

$$x0 = Xn - dn^* \cos \alpha n,\ z0 = Zn - dn^* \cos \alpha n$$

are established.

Next, the coordinates of the contact point N (xp, zp) between the contact portion 22 and the workpiece surface will be calculated.

The contact point N (xp, zp) between the contact portion 22 and the workpiece surface is located at a position displacing the center of the contact portion 22 by the radius r of the contact portion 22 in the direction of the straight line VOL orthogonal with the profile vector, which can be represented as:

$$xp = x0 + r^* \cos \alpha n,\ zp = z0 + r^* \cos \alpha n$$

Accordingly, the coordinates N (xp, zp) on the workpiece surface can be represented as:

$$xp = Xn - dn^* \cos \alpha n + r^* \cos \alpha n,$$
$$zp = Zn - dn^* \cos \alpha n + r^* \cos \alpha n$$

In other words, the profile processor 53 is provided with:

$$(xp, zp) = (Xn + (r - dn)^* \cos \alpha n,\ Zn + (r - dn)^* \cos \alpha n)$$

as profile processing formula.

Figure 6:
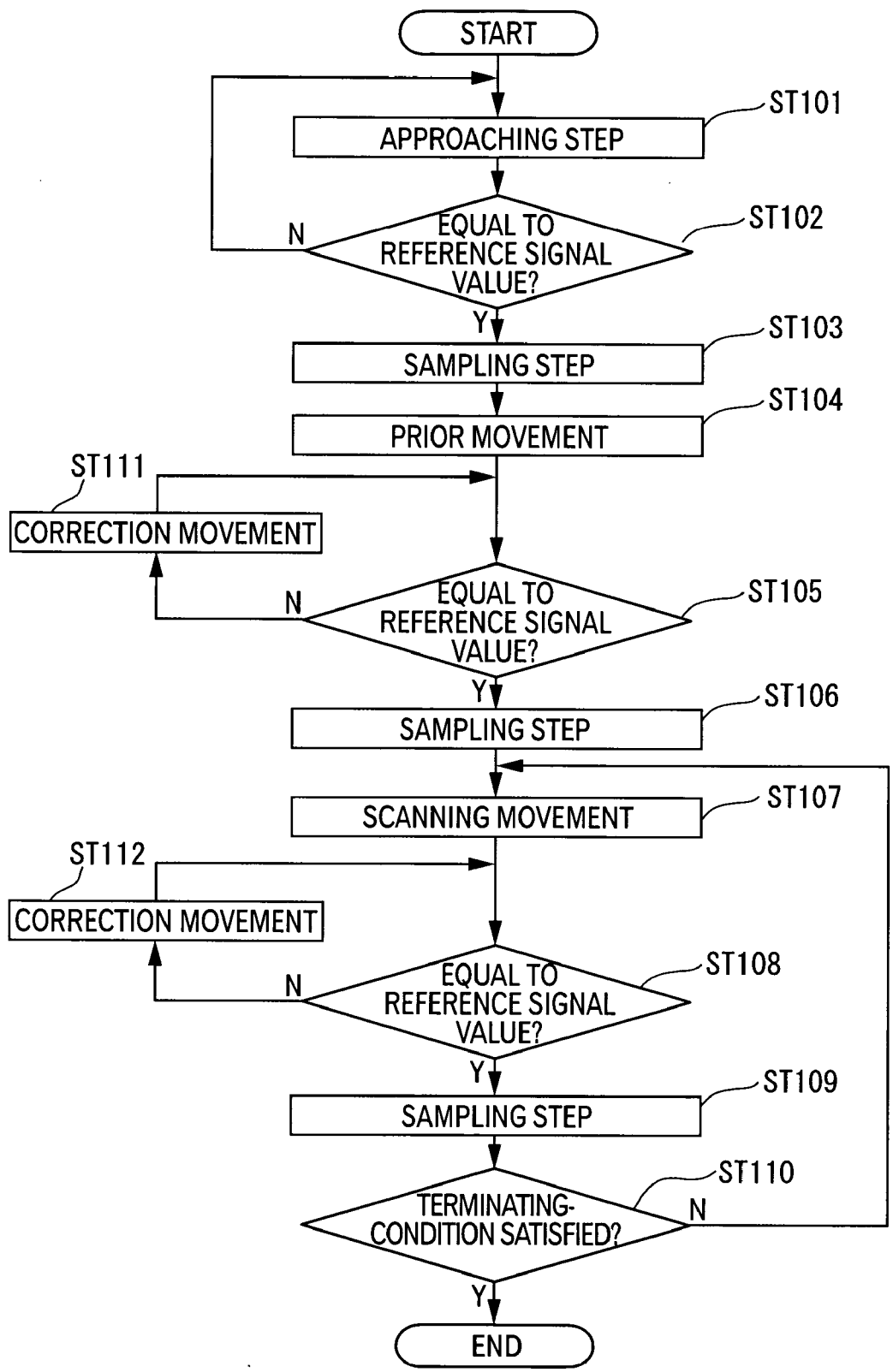
FIG. 6 is a flowchart showing scanning step of the first embodiment.
Figure 7:
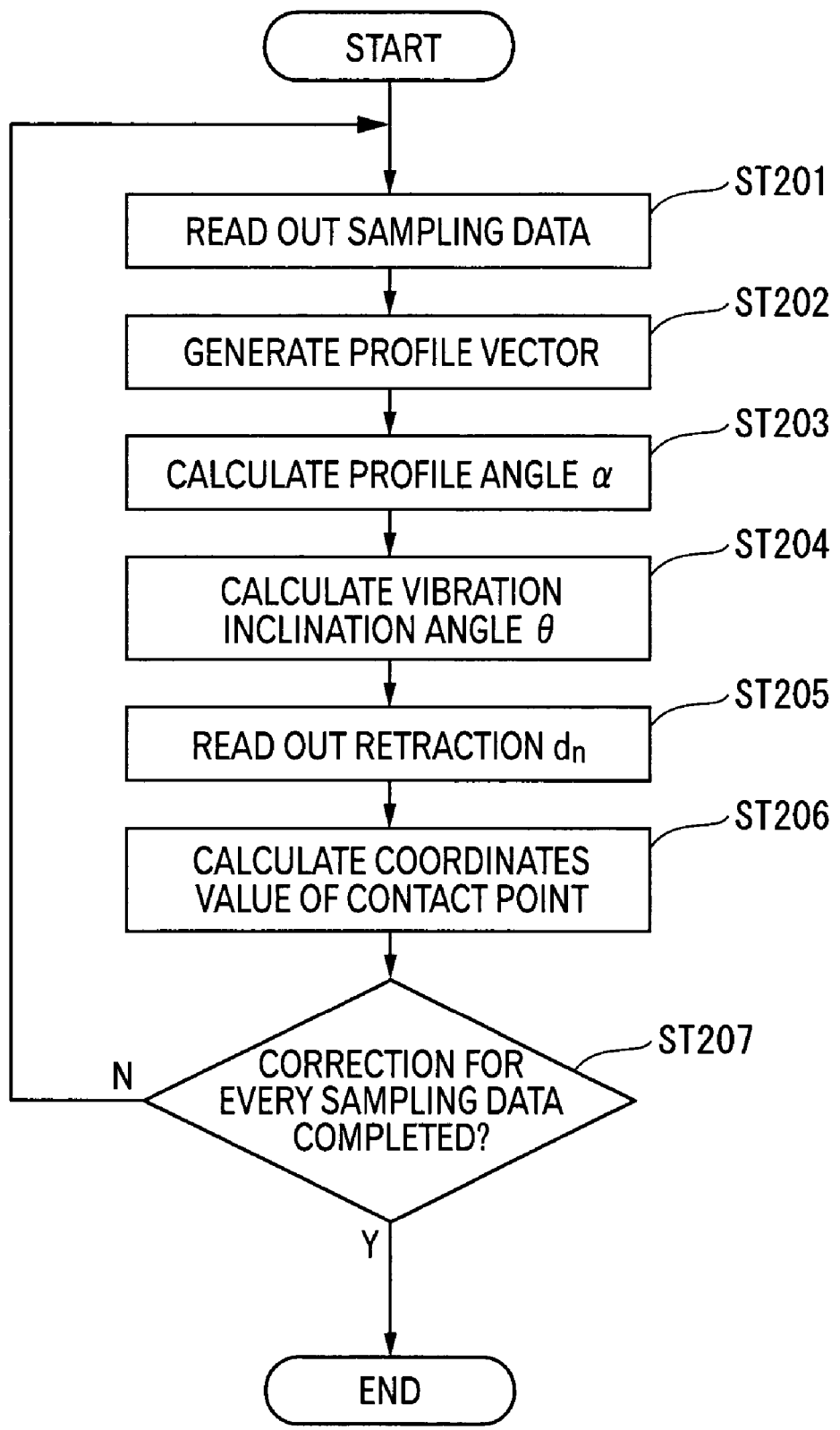
FIG. 7 is a profile processing step of the first embodiment.
Figure 8:
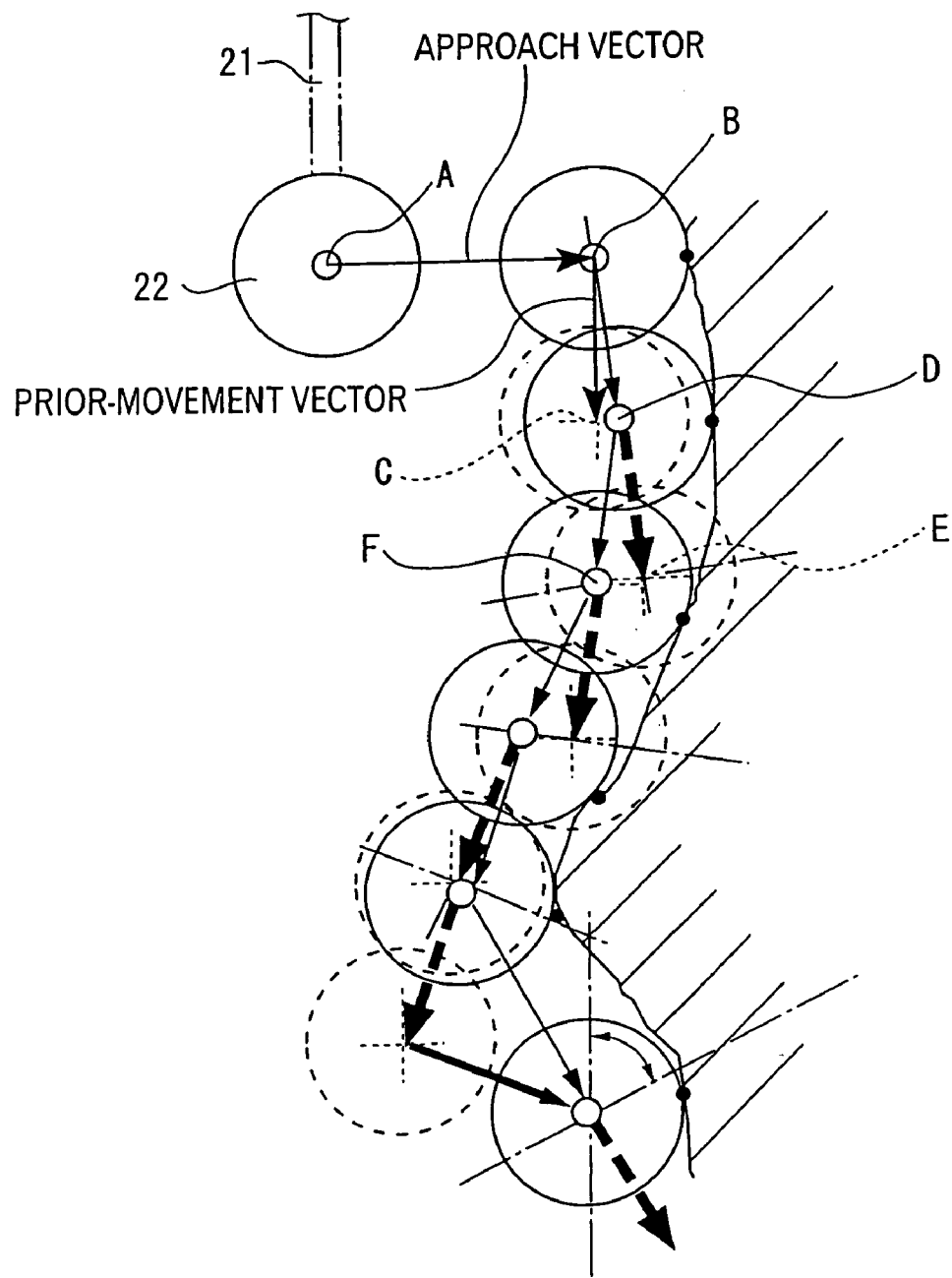
FIG. 8 is an illustration of movement locus of the contact portion of the first embodiment.

The function of the first embodiment will be described below with reference to flowcharts shown in FIGS. 5, 6, and 7 and the locus of the contact portion 22 shown in FIG. 8.

Figure 5:
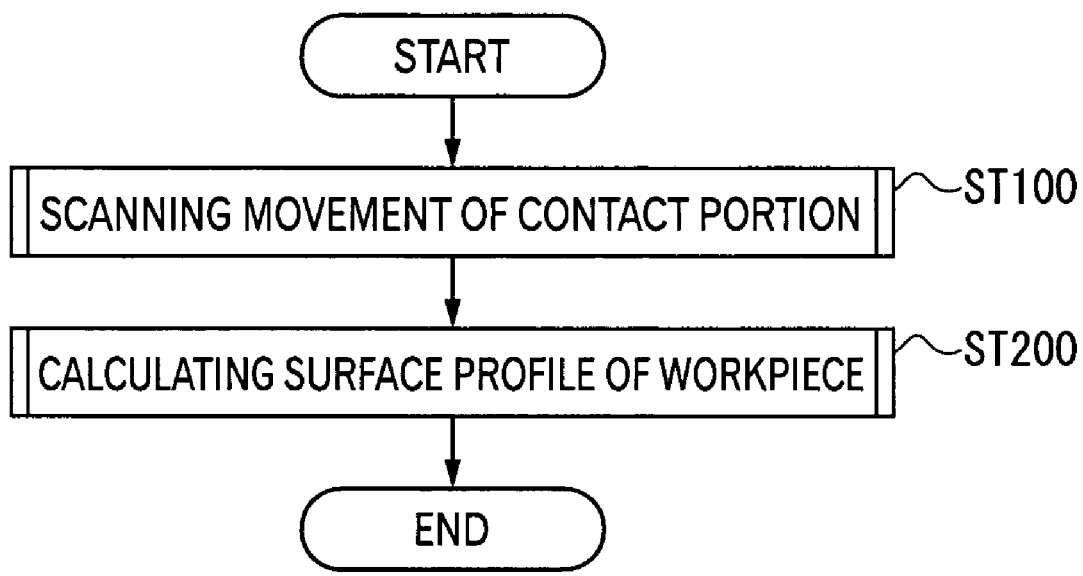
FIG. 5 is a flowchart showing specific steps of surface profile measurement of the first embodiment.

As shown in FIG. 5, the step for measuring the surface profile of the workpiece includes a step for scanning movement of the contact portion 22 along the workpiece surface (ST100) and a step for correcting the sampled position information of the contact portion 22 to obtain the surface profile of the workpiece (ST200).

Initially, the step for profile movement of the contact portion 22 will be described below with reference to flowchart shown in FIG. 6 and the locus of the contact portion 22 shown in FIG. 8.

The contact portion 22 is moved from the point A remote from the workpiece W toward the workpiece surface in accordance with the approach vector (approach step ST101).

The movement by the approach vector causes the contact portion 22 to be in contact with the workpiece surface.

Next, at ST102, whether the detection signal has reached the reference signal value or not is judged by the difference detector 42.

When the contact portion 22 only lightly touches the workpiece surface, since the vibration of the contact portion 22 is not sufficiently restricted, the detection signal does not reach the reference signal value. In other words, the contact of the contact portion 22 is not detected, which means that the probe 2 is continuously moved being driven by the drive mechanism 3 even after the contact portion 22 starts contacting the workpiece surface.

When the movement of the probe 2 by the drive mechanism 3 is continued and the stylus 21 is bent, the contact portion 22 is forcibly pressed to the workpiece surface on account of the pressing force generated when the stylus 21 is bent. When the vibration of the contact portion 22 is restricted by the pressing force and the detection signal reaches the reference signal value, the position information of the contact portion (point B) at the time is sampled (sampling step ST103).

The position information of the contact portion 22 to be sampled here is a drive amount of the drive mechanism measured by the linear encoder provided on the respective shafts of the drive mechanism 3, which is neither the position of the center coordinates of the contact portion 22 nor the coordinates of the contact point between the contact portion 22 and the workpiece surface. The position information to be sampled includes bent amount (retraction d) of the stylus 21.

As described above, though the detection signal reaches the reference signal value when the contact portion 22 touches the workpiece surface, the retraction dn varies in accordance with the manner how the workpiece surface touches the contact portion relative to the vibrating direction of the contact portion 22.

In order to obtain the center coordinates of the contact portion 22, the retraction dn has to be subtracted. Further, the radius r of the contact portion 22 has to be corrected in order to calculate actual profile of the workpiece surface, which will be described below.

After the detection signal reaches the reference signal value at the point B, the contact portion 22 is moved in a direction perpendicular to the approach vector in accordance with the prior-movement vector to reach point C (prior movement step ST104).

At the point C, since the contact portion 22 is excessively remote from the workpiece surface, the detection signal does not coincide with the reference signal value (ST105: NO). Accordingly, the contact portion 22 is moved in accordance with correction vector (correction movement step ST111).

The direction of the correction vector is perpendicular to the prior-movement vector and is equal to the orientation of the approach vector since the detection signal does not reach the reference signal value. The contact portion 22 is moved in accordance with the correction vector, and the position of the contact portion 22 is sampled when the detection signal reaches the reference signal value (at point D) (ST106).

When the detection signal has reached the reference signal value at the point D, the contact portion 22 is moved in an extension (scanning vector) of the vector (profile vector) connecting the point B where the detection signal precedingly reached the reference signal value and the current point D to reach point E (scanning step ST107).

At the point E, since the contact portion 22 is too close to the workpiece surface, the detection signal does not coincide with the reference signal value (ST108: NO) and the contact portion 22 is moved in accordance with the correction vector (ST112). The orientation of the correction vector is perpendicular to the scanning vector and, since the detection signal exceeds the reference signal value, toward the right side relative to the scanning vector in FIG. 8.

The contact portion 22 moves from the point E to point F in accordance with the correction vector, where the detection signal becomes equal to the reference signal value (ST108: YES).

The position information of the contact portion 22 at the point F is sampled (ST109).

Subsequently, the contact portion 22 is moved in the extension connecting the point F and the point D in accordance with the scanning vector and the contact portion 22 moves along the workpiece surface to conduct scanning movement.

The scanning movement is repeated until a predetermined completion condition is satisfied at ST110, and the process is terminated when the completion condition is satisfied.

The approach step (ST101), the prior movement step (ST104) and the scanning step (ST107) constitute the scanning step.

Incidentally, though the contact portion 22 is illustrated to enter into the workpiece W at the point E, the contact portion 22 does not actually enter into the workpiece W. The point E is an imaginary point of the contact portion 22 depicted based on the position information by the drive mechanism assuming that the stylus 21 is not bent.

The sampled position information after the scanning movement of the contact portion 22 is stored in the memory 46 and subsequently is outputted to the processor 47. The processor 47 conducts correcting calculation based on the position information to obtain the surface profile of the workpiece W.

Specific process for calculating the surface profile of the workpiece will be described below with reference to the flowchart of FIG. 7.

The position information stored in the memory 46 is outputted to the profile vector generator 48 (ST201). The position information includes the position information (Xn, Zn) to be processed and preceding position information $(X_{n-1}, Z_{n-1})$. Then, the profile vector is generated by the profile vector generator 48 (ST202). The profile vector is represented as $(Xn-X_{n-1}, Zn-Z_{n-1})$ (see FIG. 3).

The profile angle αn is calculated by the profile angle calculator 50 based on the profile vector and the vibrating direction of the contact portion 22 (ST203). As described above, the profile angle αn is calculated based on the formula, $\tan \alpha n = (X_n - X_{n-1})/(Z_n - Z_{n-1})$.

Further, the vibration inclination angle θn is calculated based on the formula θn (vibration inclination angle)=αn (profile angle)+90° (ST204).

The vibration inclination angle θn is outputted to the table 52.

The retraction dn corresponding to the vibration inclination angle θn is read out from the table 52 (ST205). At this time, when the vibration inclination angle θn is not stored in the table 52, the retraction dn is calculated based on the adjacent vibration inclination angle $d_{n-1}$ or $d_{n+1}$ corresponding to the preceding and succeeding vibration inclination angle $\theta_{n-1}$ or $\theta_{n+1}$ by interpolation or extrapolation. The retraction dn is outputted to the profile processor 53.

The coordinates (xp, zp) of the workpiece surface are sequentially calculated for each of the position information (Xn, Zn) and are outputted as a measurement value, thereby obtaining the profile of the workpiece surface (ST206).

In other words, the actual profile of the workpiece surface can be obtained by the formula, (xp, zp)=(Xn+(r−dn)*cos αn, Zn+(r−dn)*cos αn) for each position information (Xn, Zn).

The profile processing is conducted for all of the sampled position information, so that the actual profile of the workpiece surface can be obtained (ST207). The process is repeated until correction for every sampling data is completed, and the process is terminated when the correction for every sampling data is completed.

According to the first embodiment constructed as described above, following advantages can be obtained.

(1) When the surface profile of a workpiece is to be obtained based on the sampled position information of the contact portion 22, since the profile processing is conducted in accordance with the difference in the retraction when the detection signal reaches the reference signal value, the surface profile of a workpiece can be accurately obtained.

In other words, the vibration inclination angle θn is calculated by the vibration inclination angle calculator 51 and the retraction dn is specified when the detection signal reaches the reference signal value based on the table 52. The surface profile of the workpiece can be accurately obtained by the profile calculation in accordance with the retraction dn.

(2) Since the contact portion 22 is vibrated in the axial direction of the stylus 21 and the contact portion 22 is moved in the axial direction of the stylus 21 while scanning the workpiece surface, the relationship between the vibrating direction of the contact portion 22 and the workpiece surface can be easily obtained. Specifically, when the angle formed between the vibrating direction of the contact portion 22 and the straight line orthogonal with the profile vector is specified by the profile vector generated by connecting the position information of the object to be corrected and the preceding position information thereof, the angle formed by the vibrating direction of the contact portion 22 and the contact point of the workpiece surface can be calculated.

Accordingly, the surface profile of the workpiece W can be approximately precisely obtained by scanning movement of the contact portion 22 in the vibrating direction (i.e. the axial direction of the stylus).

(3) Since the table storing the retraction dn relative to the vibration inclination angle θn is provided, the retraction dn can be easily determined.

(3) Since the contact portion 22 is moved while scanning the surface of the workpiece surface with reference to the predetermined constant reference signal value, the scanning movement can be facilitated while employing the conventional scanning process. In other words, the function of the present embodiment can be attained only by changing the arrangement of the processor 47 while using a conventional surface profile measuring instrument.

(5) Since the orientation of the profile vector can be made close to the same direction as the measurement surface of the workpiece W by setting the magnitude of the scanning vector small in accordance with the desired scanning measurement accuracy, the accuracy for measuring the surface profile of the workpiece W can be set as desired.

(6) When so precise accuracy of the profile measurement is not required, the magnitude of the scanning vector can be set great to lengthen the scanning distance per one motion, which results in decrease in the number of correction movement by the correction vector, thus reducing the time required for measurement.

Second Embodiment

The basic arrangement of a second embodiment of the present invention is the same as the first embodiment, except for the characteristic feature of the arrangement of the controller 4.

Figure 9:
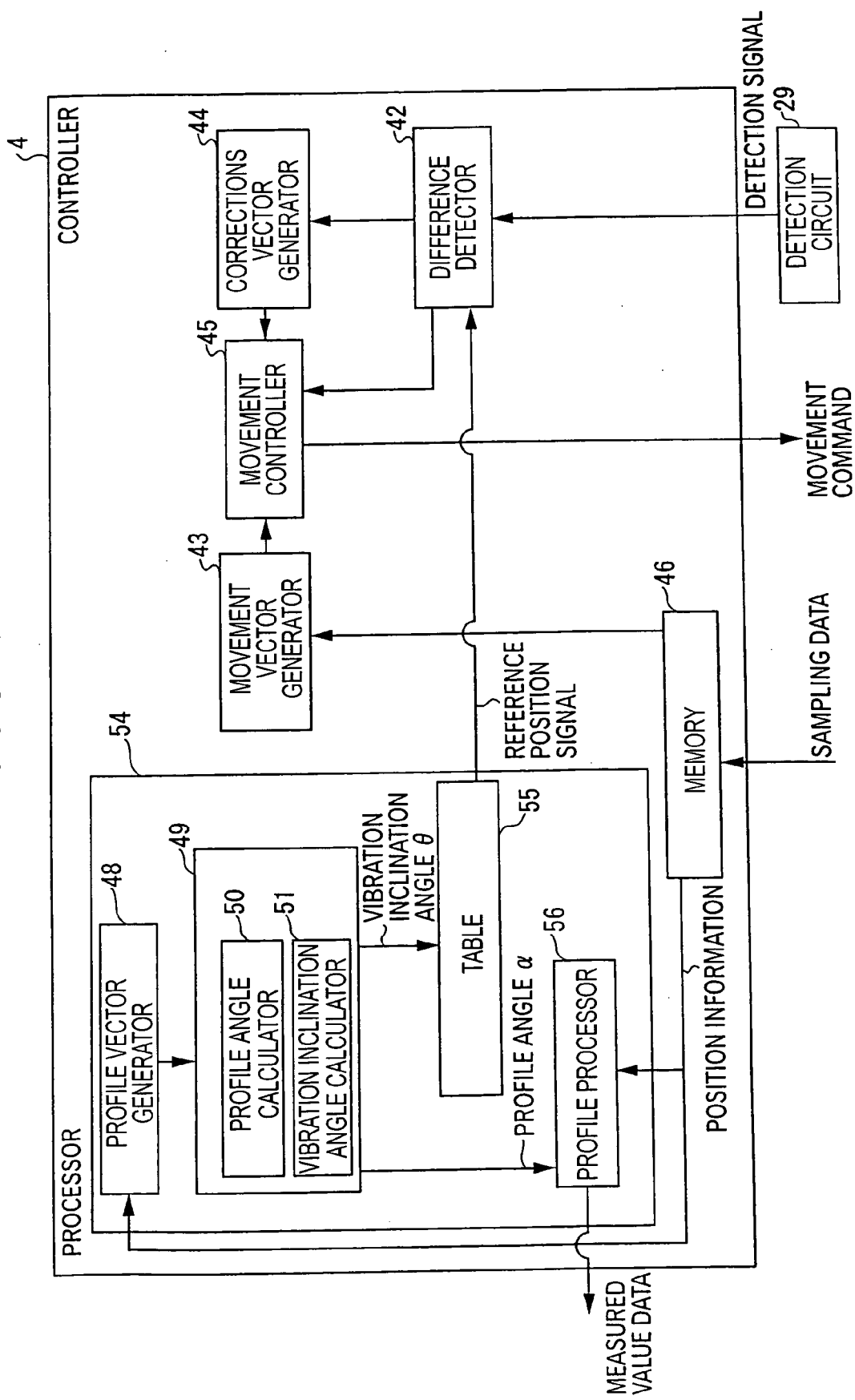
FIG. 9 is an illustration showing an arrangement of a controller of a second embodiment of a surface profile measuring instrument according to the present invention.

As shown in FIG. 9, the controller 4 has the movement controller 45, the movement vector generator 43, the correction vector generator 44, the difference detector 42, the memory 46 and a processor 54 as in the first embodiment.

However, the storing circuit in the first embodiment is not provided. The function of the movement controller 45, the movement vector generator 43, the correction vector generator 44 and the memory 46 is the same as in the first embodiment.

The basic arrangement of the processor 54 is the same as in the first embodiment, where the profile vector generator 48, the angle calculator 49 and a profile processor 56 are provided. Further, instead of the table 52 for storing the relationship between the retraction and the vibration inclination angle, a table 55 for storing reference position signal value relative to the vibration inclination angle as a reference position signal value calculator is provided in the second embodiment.

Though the function of the profile vector generator 48 and the angle calculator 49 is the same as the first embodiment, the function of the table 55 and the profile processor 56 is different from the first embodiment.

The table 55 will be described below.

Figure 10:
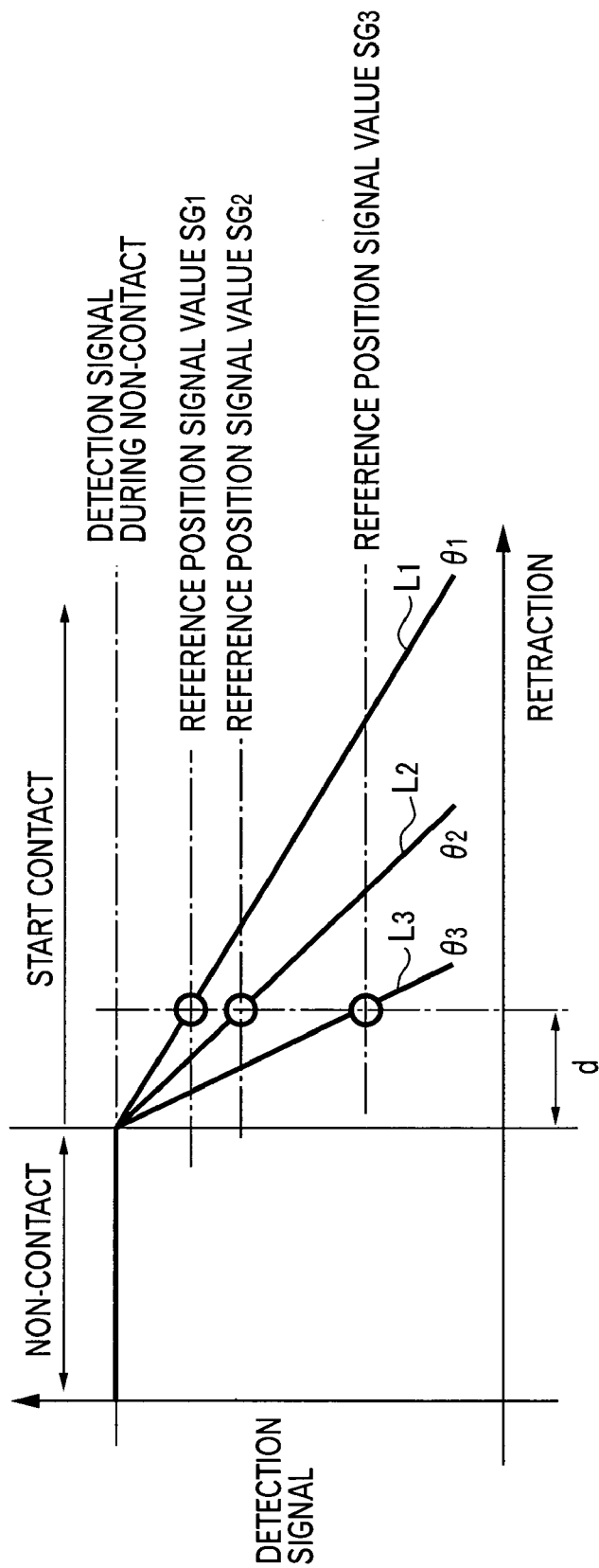
FIG. 10 is an illustration showing a relationship between a retraction and a reference position signal value of the second embodiment.

FIG. 10 shows a relationship between the vibration inclination angle θ and the detection signal. As described in the first embodiment, the relationship is previously established by examining a response L1, L2, L3 . . . Ln of the detection signal outputted when the contact portion 22 touches the workpiece surface at a vibration angle θ1, θ2, θ3, . . . θn.

The value of the detection signal (reference position signal value SGn) when the retraction d has been reached for each of the vibration inclination angle θn can be specified as shown in FIG. 10.

The table 55 stores the reference position signal value SGn corresponding to the vibration inclination angle θn. Specifically, the reference position signal SG1 corresponding to the vibration inclination signal θ1, the reference position signal SG2 corresponding to the vibration inclination signal θ2, the reference position signal SG3 corresponding to the vibration inclination signal θ3 and so on are stored in the table 55.

When the vibration inclination angle θn calculated by the vibration inclination angle calculator 51 is inputted to the table 55, the reference position signal value SGn corresponding to the vibration inclination angle θn is outputted. The reference position signal value SGn is outputted to the difference detector 42. The contact portion 22 is moved while scanning the workpiece surface based on the value of the detection signal (the reference position signal value SGn) when the contact portion 22 touches the workpiece surface by the retraction d. The position information of the contact portion 22 when the detection signal reaches the reference position signal value SGn is sampled.

The profile processor 56 is provided with a profile calculating formula for correcting the sampled position information to the coordinates of the contact point between the contact portion 22 and the workpiece surface. The surface profile of the workpiece is obtained by the position information of the contact portion using the profile calculating formula.

The calculating formula is derived based basically on the same idea as in the first embodiment, however, the retraction is set as a constant value (retraction d) in the present embodiment.

In other words, the profile calculating formula for calculating the contact point (xp, zp) of the contact portion 22 against the workpiece surface relative to the position information (Xn, Zn) is:

$(xp, zp)=(Xn+(r-d)*\cos \alpha n, Zn+(r-d)*\cos \alpha n)$

The function of the second embodiment highlighting the output timing of the reference position signal value SGn and the scanning step of the contact portion 22 will be described below with reference to the flowchart of FIG. 11 and the locus of the contact portion 22 shown in FIG. 12.

Figure 11:
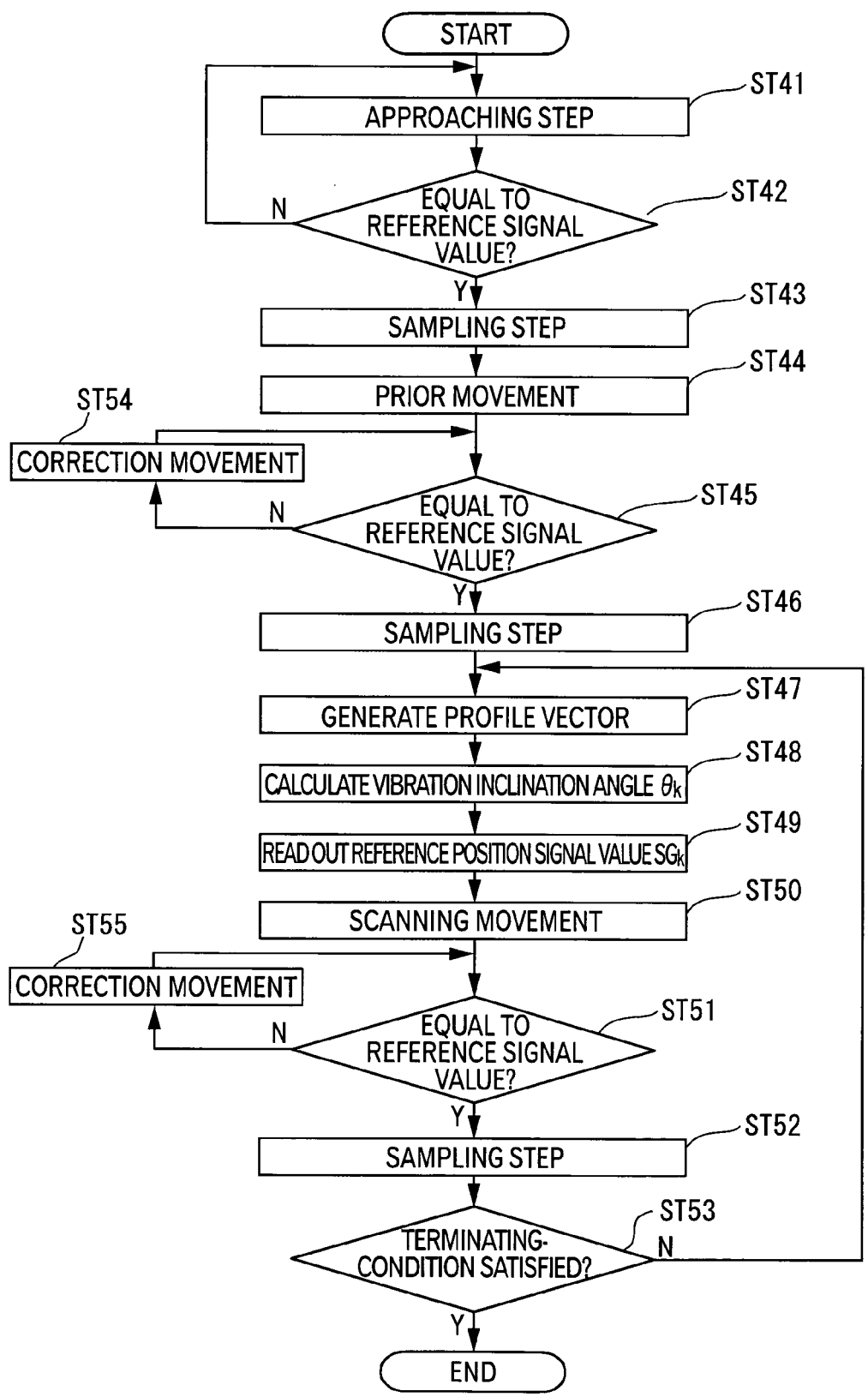
FIG. 11 is a flowchart showing a scanning step of the second embodiment.

In FIG. 11, the steps from ST41 to ST46 are basically the same as the first embodiment. However, the reference position signal value (ST42) after the approach step ST41 and the reference position signal value (ST45) after the prior movement step ST44 are reference position signal values when the vibration inclination angle is 90°.

This is because, when the approach vector is perpendicular to the stylus 21 and extends along the normal line of the workpiece surface, the angle formed between vibrating direction of the contact portion 22 and the normal line of the workpiece surface becomes 90°. Further, when the magnitude of the prior-movement vector is set small, the variation of the measurement surface inclination angle is assumed small even when the contact portion 22 is moved along the prior-movement vector, so that the angle (vibration inclination angle) formed between the vibrating direction of the contact portion 22 and the normal line of the workpiece surface can be approximated to 90°.

Figure 12:
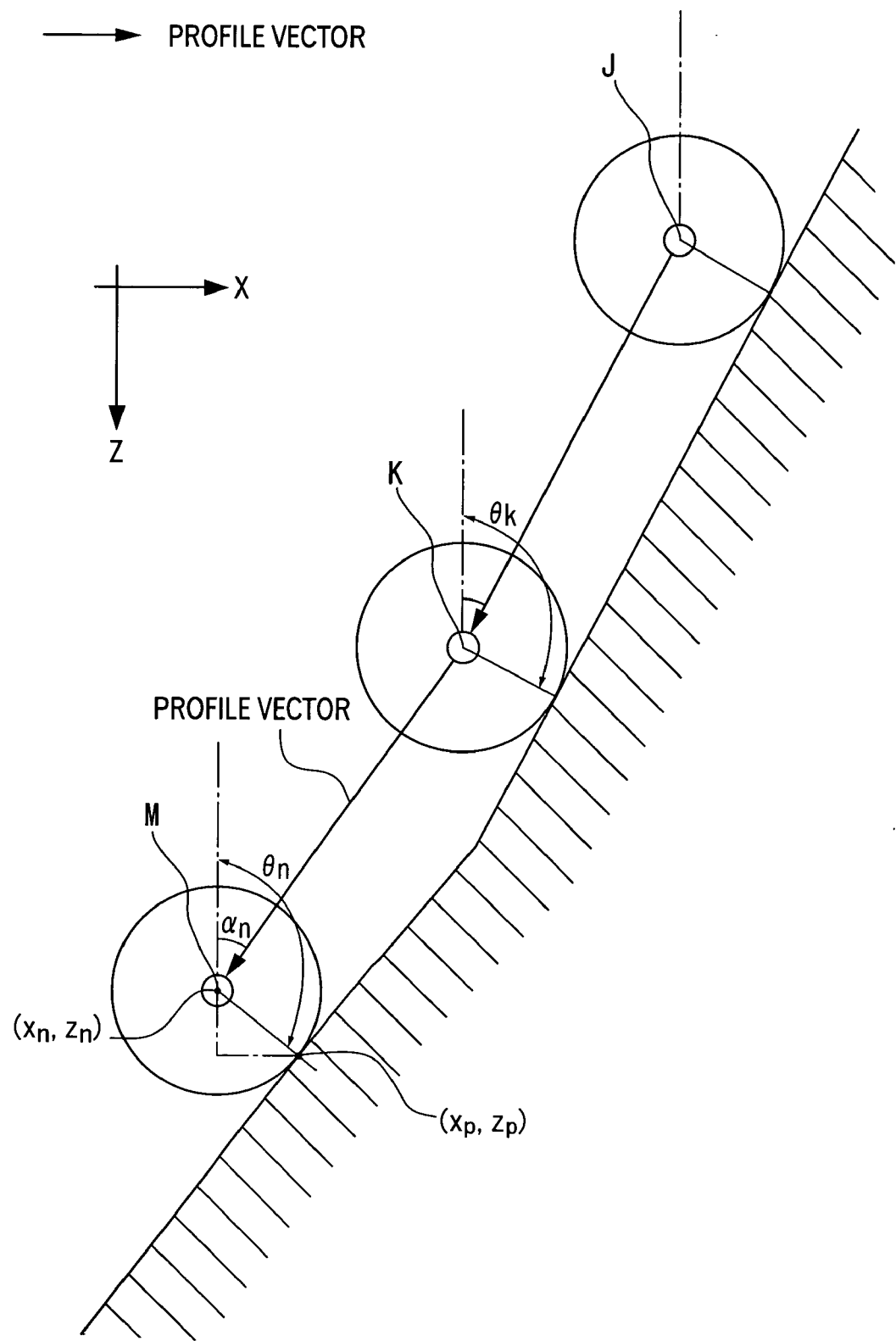
FIG. 12 is an illustration showing the movement locus of the contact portion of the second embodiment.

When the contact portion 22 is moved from a point J to a point K as shown in FIG. 12 by the scanning movement described in the first embodiment, the profile vector is generated (ST47) at the point K by the profile vector generator 48. Subsequently, the vibration inclination angle θK is calculated by the vibration inclination angle calculator 51 (ST48).

The calculated vibration inclination angle θK is outputted to the table 55. The reference position signal value SGK corresponding to the vibration inclination angle θK is read out from the table 55 (ST49). The reference position signal value SGK is outputted to the difference detector 42.

Then, the contact portion 22 is moved in accordance with the scanning vector, and the contact portion 22 is moved so that the detection signal reaches the reference position signal value SGK at the next sampling point (point M) (ST50, ST55). When the detection signal coincides with the reference position signal value SGK (ST51), the position information of the contact portion 22 is sampled (ST52).

In other words, the reference position signal value SGK at the next sampling point (point M) is estimated based on the vibration inclination angle θK at the preceding sampling point (point K).

The process from generating a profile vector is repeated until a predetermined completion condition is satisfied at ST53, and the process is terminated when the completion condition is satisfied.

The position information sampled during the scanning step is corrected by the profile processor 56. At this time, since the retraction d stays always constant, the profile calculating formula for calculating the contact point between the contact point 22 and the workpiece surface relative to the position information (Xn, Zn) is represented as:

$$(xp, zp)=(Xn+(r-d)*\cos \alpha n, Zn+(r-d)*\cos \alpha n)$$

where αn represents the profile angle.

The calculated (xp, zp) is outputted as the measurement value data.

According to the above-described second embodiment, following advantages as well as the advantages (2), (5) and (6) in the first embodiment can be obtained.

(7) The contact portion 22 is moved while scanning the workpiece surface so that the reference position signal value SG at which the reference retraction d can be obtained between the contact portion 22 and the workpiece surface is obtained. Accordingly, the sampled position information is corrected based on the constant retraction d during correction processing, thus facilitating the correction process.

(8) Since the table 55 for storing reference position signal value relative to the vibration inclination angle is provided, the reference position signal value SG at the next sampling point can be easily specified based on the vibration inclination angle 0 calculated by the vibration inclination angle calculator 51.

(9) Since the reference position signal value SG is fetched from the table 55 so that the retraction d stays constant and is compared by the difference detector 42, constant margin relative to allowable retraction limit dmax of the contact portion 22 can be obtained, thus reducing the possibility of damaging the probe on account of excessive pressing.

Incidentally, the scope of the surface profile measuring instrument and method of the present invention is not restricted to the above embodiments, but various modifications are possible as long as an object of the present invention can be achieved.

Though the table 52 in the first embodiment stores the relationship between the retraction and the vibration inclination angle, a relational formula between the retraction and the vibration inclination angle where the retraction can be calculated by the vibration inclination angle may alternatively be provided.

Though the table 55 of the second embodiment stores the relationship between the reference position signal value and the vibration inclination angle, a formula for calculating the reference position signal value based on the vibration inclination angle (reference position signal value calculating formula) may alternatively be provided.

Though the vibrating direction of the contact portion 22 is the axial direction of the stylus 21 and the scanning direction of the contact portion 22 is the vibrating direction of the contact portion (within the plane including the axial direction of the stylus 21), such arrangement is not limiting.

The scanning direction may be set within X-Y plane relative to the vibrating direction (Z-axis direction) of the contact portion 22. According to such arrangement, the measurement surface of the workpiece W is parallel to the Z-axis as shown in FIG. 16 for instance, the scanning vector and the profile vector are generated on the X-Y plane, where the surface profile of the workpiece W can be obtained by correcting the retraction dn and the radius r assuming that the contact point between the contact portion 22 and the workpiece W is in the direction passing the sampling point and orthogonal with the profile vector.

When the contact point of the workpiece W is always at an equatorial position (on a plane passing the center of the contact portion 22 and orthogonal with the stylus 21) of the contact portion 22, since the vibration inclination angle is 90° (standard measuring point), the measuring point deviation is zero and there is no change in the response variation factor. However, in such arrangement, the longitude (on X-Y plane) of the contact point between the contact portion and the workpiece W is necessary to be specified. In determining the latitude, more accurate contact point can be specified by assuming that the contact point between the contact portion 22 and the workpiece W lies in a direction of a straight line orthogonal with the calculated profile vector and passing the sampling point (the point indicated by the position information).

In such arrangement, when the measurement surface of the workpiece W is not parallel to the Z-axis, since the vibration inclination angle changes, either the first embodiment (variable retraction) or the second embodiment (constant retraction) may also be applied. In other words, when the inclination of the measurement surface of the workpiece W varies on the X-Y plane and is inclined relative to the Z-axis, the vibration inclination angle θn may be obtained by the profile angle αn as shown in FIG. 3 and the surface profile on the X-Y plane may be obtained using the retraction dn corresponding to the vibration inclination angle θn.

Further, though the axis of the stylus 21 is parallel to the Z-axis in the above-described embodiments, the axis of the stylus 21 may be inclined in any directions. In other words, any arrangement for the stylus 21 is possible as long as the measuring point deviation relative to the standard measuring point can be determined.

The present invention can be applied not only to a vibrating probe but also to any probe as long as the detection signal changes relative to the retraction.

A profiling probe capable of detecting the distortion of the stylus 21 may be used instead of vibrating contact probe 2.

The workpiece W may be moved instead of moving the contact portion 22, or alternatively, both of the contact portion 22 and the workpiece W may be moved.

Though the step ST200 for calculating the surface profile of the workpiece is conducted after the step ST100 for moving the contact portion 22 while scanning the workpiece surface in the above embodiments, the position information may be sequentially corrected into the surface profile of the workpiece simultaneously with ST200 while sampling the position information in ST100. Since the profile processors 53 and 56 are independent from the profile vector generator 48 and the angle calculator 49, the profile can be calculated while conducting the scanning movement.

Figure 13C:
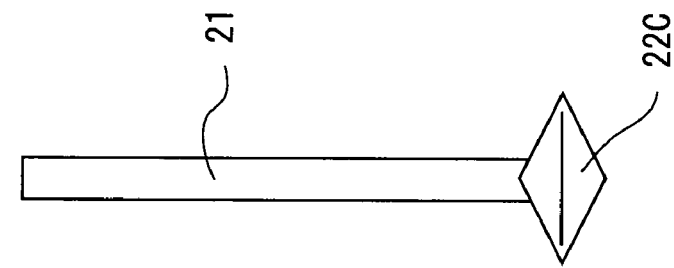
FIGS. 13(A) to (C) are illustrations showing a modifications of the contact portion.
Figure 13B:
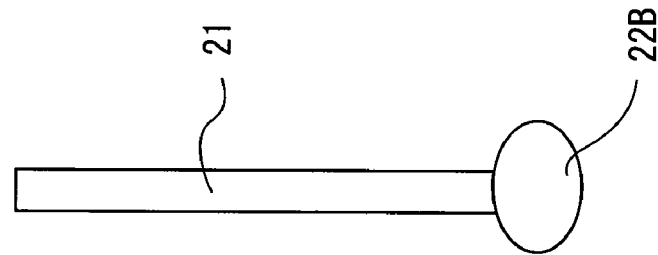
Figure 13A:
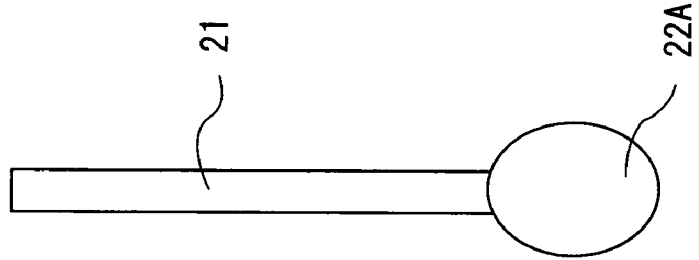

Though the contact portion 22 is configured as a sphere of radius r in the above-described embodiments, various configurations are possible as shown in FIG. 13. For instance, contact portions 22A and 22B having elliptic cross section shown in FIGS. 13(A) and (B) or bead-shaped contact portion 22C having acute-angle end in a direction perpendicular to the stylus 21 as shown in FIG. 13(C) may be used.

When the contact portions 22A and 22B shown in FIGS. 13(A) and (B) are used, the direction of the contact point between the contact portion and the workpiece surface may be calculated in a direction perpendicular to the profile vector as in the above-described embodiments. However, the length of the radius r has to be considered in accordance with profile angle α.

When the contact portion 22C of FIG. 13(C) is used, the contact point between the contact portion 22C and the workpiece surface may be set perpendicular to the stylus 21.

Though the scanning vector is aligned in a direction of extension connecting the preceding position information and the current position information in the above-described embodiments, the orientation of the scanning vector may always be aligned with the vibrating direction of the contact portion 22, i.e. the axial direction of the stylus 21. There is no limitation in the method of scanning movement but the scanning process may be conducted in any manner as long as the contact portion can move while scanning the workpiece surface so that the detection signal becomes the reference signal value or the reference position signal value.

Though the profile angle α is calculated based on the angle formed between the profile vector connecting the preceding position information and the current position information and Z-axis (tan α) in the above embodiments, the profile angle α may be calculated based on inner product of the orientation of the profile vector and the vibrating direction of the contact portion.

The surface profile measuring instrument and the surface profile measuring method of the present invention can be applied to a non-contact probe. For instance, when a sensor head shown in FIGS. 4(A) to (C) (corresponding to the contact portion 22 of FIG. 4) of an electrostatic capacitance probe is off the normal condition (a condition where the workpiece surface is parallel to Y-Z plane when the sensor head measures in the X-axis direction) to cause relative inclination and the facing angle of the sensor head relative to the measurement surface of the workpiece W is varied to cause change in the sensitivity characteristics as in FIG. 4(D) thus requiring correction of the distance Gap between the sensor head and the measurement surface of the workpiece (corresponding to retraction d1 in FIG. 4), the surface profile of the workpiece W can be obtained with higher accuracy by applying the present invention according to the first embodiment shown in FIG. 2 or the second embodiment shown in FIG. 9. In this case, the response variation factor is the change in the facing angle of the measurement surface of the workpiece W, the standard measurement point is set at the normal condition and the measurement point deviation can be set as the deviation angle from the normal condition.

What is claimed is:

1. A surface profile measuring instrument for measuring a surface profile of a workpiece, comprising:
    a probe having a stylus provided with a measuring portion for measuring a surface of a workpiece at a tip end thereof and a detector for outputting a detection signal which varies depending on a measurement condition between the surface of the workpiece and the measuring portion;
    a scanning mechanism for relatively moving the measuring portion along the surface of the workpiece;
    a sampling unit that samples linear position information of the measuring portion when the detection signal reaches a predetermined reference signal value;
    a response variation factor calculator for calculating a response variation factor based on the linear position information of the measuring portion when the detection signal reaches the reference signal value, the response variation factor applying variation to a response of the detection signal from the surface of the workpiece; and
    a profile processor that corrects the linear position information to obtain an actual profile of the surface of the workpiece using the response variation factor.

2. The surface profile measuring instrument according to claim 1,
    wherein the response variation factor is a deviation between a measuring point on the surface of the workpiece when the detection signal reaches the reference signal value and a standard measuring point of the measuring portion, and
    wherein the profile processor includes a correction amount deriving unit that specifies a correction amount of the linear position information by the response variation factor.

3. The surface profile measuring instrument according to claim 2, wherein the correction amount deriving unit is a table storing a relationship between the correction amount and the response variation factor.

4. The surface profile measuring instrument according to claim 2, wherein the correction amount deriving unit is a correction amount calculating formula that calculates the correction amount based on the response variation factor.

5. The surface profile measuring instrument according to claim 2, wherein the deviation is calculated on the basis of a profile vector connecting a first position information of the measuring portion when the detection signal reaches the reference signal value and a second position information of the measuring portion when the detection signal precedingly reached the reference position signal value.

6. The surface profile measuring instrument according to claim 1, wherein the probe is a contact probe having a contact portion as the measuring portion, and
    wherein the detector has a vibrator that vibrates the contact portion in one direction and a vibration detector that detects a variation in the vibration of the contact portion.

7. The surface profile measuring instrument according to claim 6, wherein the response variation factor is an angle formed between the measuring point of the surface of the workpiece when the detection signal reaches the reference signal value and the vibrating direction of the contact portion, and wherein the profile processor has a correction amount deriving unit that determines a correction amount based on the response variation factor, the correction amount being a variation amount of the linear position information from the time when the contact portion starts touching the surface of the workpiece to the time when the detection signal reaches the reference signal value.

8. The surface profile measuring instrument according to claim 6, wherein the vibrating direction of the contact portion is aligned with the axial direction of the stylus, and wherein the scanning mechanism moves the measuring portion within a plane including the axis of the stylus.

9. A surface profile measuring method for measuring a surface profile of a workpiece, comprising the steps of:

providing a probe having a stylus provided with a measuring portion for measuring a surface of a workpiece at a tip end thereof and a detector for outputting a detection signal which varies depending on a measurement condition between the surface of the workpiece and the measuring portion;

relatively moving the measuring portion along the surface of the workpiece while scanning;

sampling a linear position information of the measuring portion when the detection signal reaches a predetermined reference signal value;

calculating a response variation factor that applies variation to the detection signal from the surface of the workpiece based on the linear position information of the measuring portion when the detection signal reaches the reference signal value; and correcting the linear position information using the response variation factor to obtain an actual profile of the surface of the workpiece.

* * * * *